(12) United States Patent
Fedorchuk et al.

(10) Patent No.: US 12,190,412 B2
(45) Date of Patent: *Jan. 7, 2025

(54) VISUALIZATIONS OF MULTI-NODAL TRANSFERS AND GESTURE-BASED INTERACTIVITY IN VIRTUAL OR AUGMENTED REALITY

(71) Applicant: Wells Fargo Bank, N.A., San Francisco, CA (US)

(72) Inventors: Andriy Fedorchuk, San Francisco, CA (US); Rajiv Ranjan, San Francisco, CA (US); Sreenath Sandru, San Francisco, CA (US); Shivani Singh, San Francisco, CA (US)

(73) Assignee: Wells Fargo Bank, N.A, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/395,303

(22) Filed: Dec. 22, 2023

(65) Prior Publication Data
US 2024/0127494 A1    Apr. 18, 2024

Related U.S. Application Data

(63) Continuation of application No. 17/991,480, filed on Nov. 21, 2022, now Pat. No. 11,854,117, which is a
(Continued)

(51) Int. Cl.
*G06T 11/00* (2006.01)
*G06F 3/01* (2006.01)
(Continued)

(52) U.S. Cl.
CPC .............. *G06T 11/00* (2013.01); *G06F 3/017* (2013.01); *G06F 9/541* (2013.01); *G06N 20/00* (2019.01);
(Continued)

(58) Field of Classification Search
None
See application file for complete search history.

(56) References Cited

U.S. PATENT DOCUMENTS 7,021,528 B2    4/2006    Igval et al.
7,925,586 B2    4/2011    Cole et al.
(Continued)

FOREIGN PATENT DOCUMENTS

| CN | 101241583 A | 8/2008 |
|---|---|---|
| EP | 1 139 264 A2 | 10/2001 |
| WO | WO-2010/093931 A1 | 2/2010 |

OTHER PUBLICATIONS

Duarte, "Blockchain Technologies Applied to Interbank Transfers," (Jul. 2019), University of Portugal, (https://repositorio-alberto.up.pt/bitstream/10216/122814/2/358238.pdf).
(Continued)

*Primary Examiner* — Yanna Wu
(74) *Attorney, Agent, or Firm* — Foley & Lardner LLP

(57) ABSTRACT

Disclosed is an approach for generating interactive visualizations for multi-nodal transfers that may involve terminal nodes and multiple transitional nodes by using various protocols to acquire data from computing systems or devices associated with each node. A first visualization layer comprising a set of geographic or physical indicators in a multi-nodal transfer route (which comprises a set of three or more nodes) may be generated. API protocols (and/or non-API protocols) corresponding to each node in the transfer route may be identified. The protocols may be executed to obtain, from computing systems and devices associated with the nodes, data packets used to generate a second visualization layer, which may comprise graphics that visually depict details of a transfer along the transfer route. An overlay of
(Continued)

visualization layers may be displayed such that the graphics are displayed in association with multiple nodes.

20 Claims, 9 Drawing Sheets

Related U.S. Application Data continuation of application No. 17/119,700, filed on Dec. 11, 2020, now Pat. No. 11,508,097.

(51) Int. Cl.
*G06F 9/54* (2006.01)
*G06N 20/00* (2019.01)
*G06Q 20/10* (2012.01)
*G06F 3/04842* (2022.01)
*G06F 3/16* (2006.01)

(52) U.S. Cl.
CPC ............. *G06Q 20/10* (2013.01); *G06F 3/013* (2013.01); *G06F 3/04842* (2013.01); *G06F 3/167* (2013.01); *G06T 2200/24* (2013.01)

(56) References Cited

U.S. PATENT DOCUMENTS

| | | |
|---|---|---|
| 9,043,246 B2 | 5/2015 | Serebrennikov |
| 10,062,108 B2 | 8/2018 | Mulhim |
| 10,078,863 B2 | 9/2018 | Loganathan |
| 10,083,482 B2 | 9/2018 | Mehew et al. |
| 10,163,083 B2 | 12/2018 | Guido et al. |
| 10,212,157 B2 | 2/2019 | Dolan et al. |
| 10,296,875 B1 | 5/2019 | Prasad et al. |
| 10,339,608 B1 | 7/2019 | Haitz et al. |
| 10,535,045 B2 | 1/2020 | Meszaros et al. |
| 10,564,796 B2 | 2/2020 | Friedman et al. |
| 10,956,244 B1 | 3/2021 | Cho |
| 11,017,347 B1 | 5/2021 | Choudhury et al. |
| 2003/0208440 A1 | 11/2003 | Harada et al. |
| 2004/0199463 A1 | 10/2004 | Deggendorf |
| 2005/0171811 A1 | 8/2005 | Campbell et al. |
| 2006/0277143 A1 | 12/2006 | Almonte et al. |
| 2008/0015985 A1 | 1/2008 | Abhari et al. |
| 2011/0093324 A1 | 4/2011 | Fordyce et al. |
| 2013/0325604 A1 | 12/2013 | Yeri et al. |
| 2014/0118829 A1 | 5/2014 | Ma et al. |
| 2015/0051894 A1 | 2/2015 | Shokooh et al. |
| 2016/0217399 A1* | 7/2016 | Roelofs .................. G06Q 10/08 |
| 2017/0364920 A1 | 12/2017 | Anand |
| 2019/0377417 A1 | 12/2019 | Friedman et al. |
| 2019/0378182 A1 | 12/2019 | Weinflash et al. |

OTHER PUBLICATIONS

Team Truly, "Wire Transfers Explained: 10 Things You Absolutely Need to Know," (Feb. 23, 2022), Truly Financial, Blog (https://trulyfinancial.com/blog/wire-transfers-explained/).

* cited by examiner

VISUALIZATIONS OF MULTI-NODAL TRANSFERS AND GESTURE-BASED INTERACTIVITY IN VIRTUAL OR AUGMENTED REALITY

CROSS-REFERENCE TO RELATED APPLICATIONS

This application is a continuation of U.S. patent application Ser. No. 17/991,480 filed Nov. 21, 2022, which is a continuation of U.S. patent application Ser. No. 17/119,700 filed Dec. 11, 2020, the entirety of each of which is incorporated herein by reference.

TECHNICAL FIELD

Embodiments and aspects of the innovation relate to rendering visualizations of multi-nodal transfers and interactivity with the visualizations.

BACKGROUND

Multi-destination transfers of goods and funds are becoming more prevalent, including transfers across international borders. In the process of the transfer, the items may make multiple stops along a route from a source to a destination. For example, goods may begin by leaving on a truck from the sending entity, have a first stop or transfer at a shipping yard, a second stop or transfer at a second shipping yard, and a third stop or transfer to another trucking entity before actually reaching the destination. In another example, funds transferred internationally via, for example, wire transfer may include multiple intermediary destinations. Use of intermediary enterprises introduces uncertainties, as products or funds may become untraceable for certain periods of time, may be delayed, or may simply go missing with little explanation.

SUMMARY

Various embodiments relate to a computer-implemented method comprising: generating a first visualization layer comprising a set of geographic or physical indicators in a multi-nodal transfer route comprising a set of three or more nodes that include terminal nodes and at least one transitional node; identifying a first computing application program interface (API) protocol corresponding to a first node in the transfer route, and a second API protocol corresponding to a second node in the transfer route; executing the first API protocol to obtain, from a first computing system, a first data packet corresponding to the first node, and executing the second API protocol to obtain, from a second computing system, a second data packet corresponding to the second node; generating a second visualization layer comprising, (i) based on the first data packet, a first graphic visually depicting a first detail of a transfer of an item along the transfer route and, (ii) based on the second data packet, a second graphic visually depicting a second detail of the transfer of the item along the transfer route; and displaying an overlay of the first visualization layer with the second visualization layer such that the first graphic and the second graphic are displayed in association with at least two nodes in the set of nodes.

Various embodiments relate to a system including a processor and a memory storing instructions thereon. The instructions, when executed by the processor, cause operations including generate a first visualization layer comprising a set of geographic or physical destinations in a route, the set of destinations comprising a first node, a second node, and a third node, identify a first computing application program interface (API) protocol corresponding with the first node, and a second API protocol corresponding with the second node, execute the first API protocol to obtain, from a first computing system, a first status of a transfer and executing the second API protocol to obtain, from a second computing system, a second status of the transfer, generate a second visualization layer comprising a first graphic corresponding with the first status and a second graphic corresponding with a second status, and provide a graphical user interface (GUI) comprising an overlay of the first visualization layer with the second visualization layer such that at least two nodes in the set of destinations are displayed in association with the first and second graphics.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Figure 1:
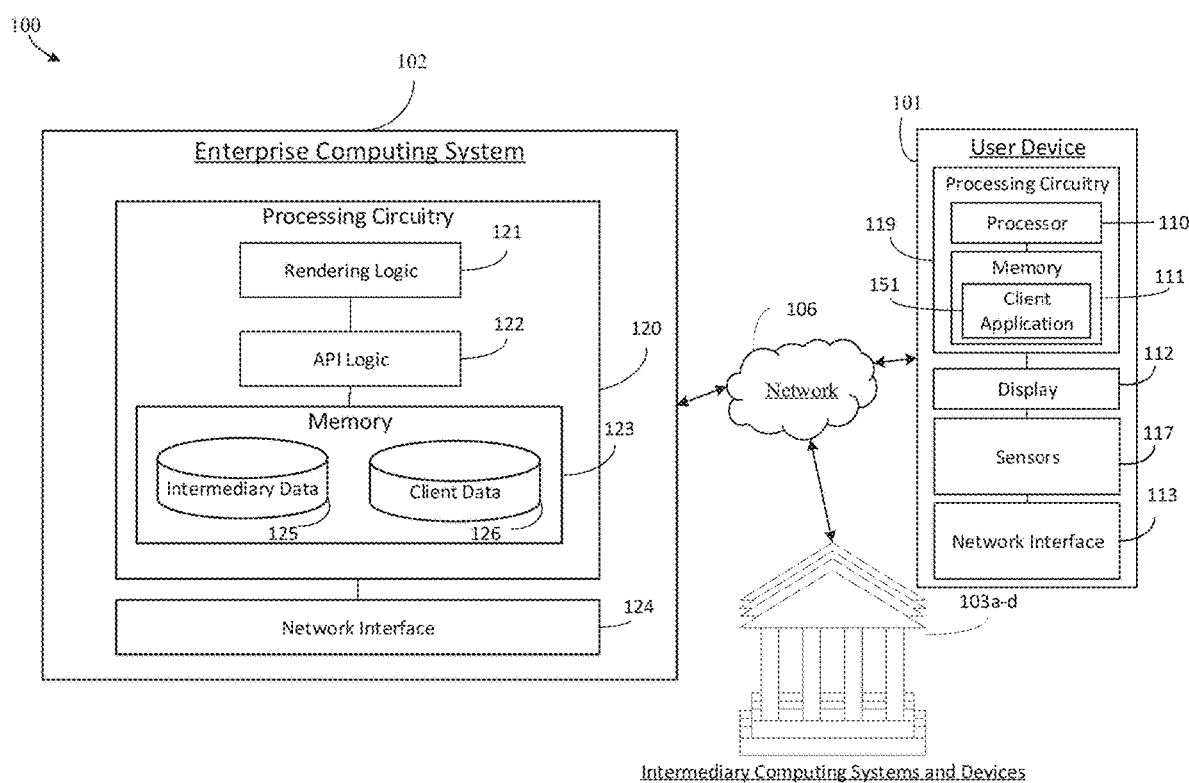
FIG. 1 is a block diagram of an international transfer system, according to various potential embodiments.

Systems, apparatuses, and methods for rendering and providing enhanced visualizations of multi-nodal transfers according to various embodiments are disclosed herein. A computing system of a service provider or other enterprise that is facilitating or otherwise involved in a multi-nodal transfer may render or generate a visualization of a set of geographic or physical destinations along a transfer route and present the visualization to a display, for example, on a user device. The visualization is interactive such that a user of the user device can interact with the visualization in order to obtain information regarding the transfer. For example, responsive to a user input, the enterprise computing system determines whether additional information is needed, determines how to access or retrieve the additional information from one or more external computing systems, and updates one or more layers of the visualization to enhance interactivity among the user, enterprise computing system, and the external computing systems. As used herein, a "transfer" is advancement or movement of funds or goods that involves terminal nodes (associated with, e.g., a source computing system and a destination computing system) and various transitional nodes (associated with, e.g., various intermediary computing systems). In various embodiments, computing systems in multi-nodal transfers lack data or visibility on other nodes and computing systems involved in the transfers. Similarly, a user may additionally lack any information on a transfer after it has been initiated by a terminal computing system and/or until after it has been received at another terminal computing system (e.g., information on transitional nodes available to intermediary computing systems).

In various embodiments, the disclosed approach obviates obfuscation via various computing processes that are configured to acquire particularized data and render graphical depictions of that data in interactive visualizations. Moreover, the computing system may generate and update multi-layered visualizations that are responsive to one or more user inputs. As such, the computer systems and methods described herein provide an improved ability for the various computing systems to interact with one another and for the enterprise computing system to interact with clients/users. The enterprise computing system uniquely acquire and characterize data on transitional nodes via application programming interface (API) protocols, generate multi-layered visualizations, and display overlays of layers on, for example, augmented reality (AR) or virtual reality (VR) devices. The enterprise computing system may dynamically determine a computing source for that information, execute one or more protocols to retrieve the information from the computing source, and update the visualization in an interactive manner. Beneficially, the enterprise computing system improves the ability of the computing system to interact with users based on dynamic management of information retrieved from one or more terminal and/or intermediary computing systems.

Referring now to FIG. 1, a block diagram of an international transfer system 100 is shown according to an example embodiment. The system 100 includes a user device 101 associated with a client/user, an enterprise computing system 102 associated with an enterprise institution, and multiple intermediary computing systems 103a-c (e.g., computing devices of multiple intermediary enterprises that are leveraged as part of a multi-destination transfer) that are configured to communicate over a network 106. The user device 101 is owned by or otherwise associated with a client/user. The user may be an individual, business representative, large and small business owner, and so on. The user or client may be an existing or a new client to the enterprise associated with the enterprise computing system 102. As described above, the enterprise computing system may be a financial institution computing system, department store computing system, government department computing system, or other type of computing system that facilitates multi-nodal transfers. In the example shown, the enterprise computing system is a financial institution computing system that is able to transfer monetary contents to a destination enterprise computing system. That is, in the example shown, the financial institution computing system may initiate a multi-nodal transfer. In other configurations, the enterprise computing system may be an independent platform that provides a service of monitoring multi-nodal transfers from an initiating enterprise computing system to a destination enterprise computing system. In some embodiments, the transfer may be an international money transfer, international wire transfer, or an international transfer of goods. The present disclosure is applicable with each configuration.

The intermediary computing systems 103a-d are computing systems associated with respective geographic or physical destinations in a route of the transfer. The intermediary computing systems 103a-d may include one or more computing devices or systems that are configured to interact and communicate with the enterprise computing system 102 via the network 106. For example, intermediary computing systems 103a-d various server systems, computers, or other computing devices that include an API that allows for the communication of data with the enterprise computing system 102 over the network. For example, once the enterprise computing system 102 determines that a particular intermediary computing system is involved with a transfer, the enterprise computing system 102 may execute an API protocol to request for a first status of the transfer from the respective intermediary computing system 103a. In return, the intermediary computing system 103a is configured to obtain information for the first status and transmit the first status to the enterprise computing system 102. In the example of the transfer being an international monetary transfer, the first status may include information regarding the entity that the intermediary computing system received the transfer from (e.g., sending entity information), information regarding the entity that the intermediary computing system is sending or sent the transfer to (e.g., receiving entity information), the currency and amount received from the sending entity, the currency and amount sending to the receiving entity, an identification of the agent or employee associated with the transfer at the sending entity, an identification of the agent or employee associated with the transfer at the intermediary computing system, and/or an identification of the agent or employee associated with the transfer at the receiving entity.

The user device 101 is configured to interact with a user such that the client may conveniently and efficiently interact with the visualization of the transfer. The user device 101 is shown to include processing circuitry 119 (also referred to as a processing circuit) including a processor 110 and a memory 111, a display 112, and a network interface 114. It should be appreciated that the user device may also include other elements as well, such as a vibrate-able element, a speaker, etc. The user device 101 is structured to and configured to enable the user to access the network 106 (e.g., to send and receive information/data over the network). Examples of the user device 101 include a mobile phone such as a smartphone, a tablet, a wearable computing device (e.g., an augmented reality eye ware device), a laptop etc. Wearable computing devices refer to any type of device that an individual wears including, but not limited to, a watch (e.g., a smart watch), glasses (e.g., eye glasses, sunglasses, smart glasses, virtual reality (VR) glasses, augmented reality (AR) glasses etc.), bracelet (e.g., a smart bracelet), etc. In some embodiments, the user device 101 includes one or more sensors 117 that allow for user inputs via the user device 101. The one or more sensors 117 may include various cameras, detectors, light sources, and or other electronic equipment configured to capture one or more user inputs. In some embodiments, the one or more sensors 117 include an eye tracking system, a gesture or proximity sensing system, a depth sensing system, a touch screen, and/or a combination thereof.

The user device 101 may include program logic (e.g., instructions) stored by the memory 111 and executable by the processor 110 to implement at least some of the functions described herein. The processor 110 may be implemented as an application specific integrated circuit (ASIC), one or more field programmable gate arrays (FPGAs), a digital signal processor (DSP), a group of processing components, or other suitable electronic processing components. The memory device 111 (e.g., RAM, NVRAM, ROM, Flash Memory, hard disk storage, etc.) may store data and/or computer code for facilitating the various processes described herein. Accordingly, the memory device 111 may be or include tangible, non-transient volatile memory or non-volatile memory. The memory device may include database components, object code components, script components, or any other type of information structure for supporting the various activities and information structures described herein.

As shown, the user device 101 includes an enterprise client application 151. The enterprise client application 151 is coupled to the enterprise computing system 102 such that information may be exchanged between the enterprise computing system 102 and the client application 151. In one embodiment, the enterprise client application 151 is hard coded into the memory 111. In another embodiment, the processor 110 may be configured to download the client application 151. For example, a developer may make or create the client application 151 to be downloaded (e.g., via an app store, or in another manner). Responsive to a selection of an appropriate link, the enterprise client application 151 can be transmitted to the user device 101 and cause itself to be installed on the user device 101. Installation of the enterprise client application 151 allows the client application 151 to be executable by the processor 110. Examples of downloadable enterprise client applications 151 include a mobile banking application, a mobile wallet application, and so on. The client application 151 may be a thin or a thick application. In either situation, the execution of the application (either thick, thin, or smart client application) may enable the user to access one or more accounts of the client (e.g., provided and maintained by the enterprise computing system). Accordingly, execution of the application allows functions associated with that application. In the example shown, the enterprise client application 151 is a mobile banking application that enables a user to view, access, and manage accounts administered by the enterprise institution computing system (e.g., checking and/or savings account, mortgage account, brokerage account, and so on) or view or manage transfers of the user as described herein.

The network interface 114 may include one or more antennas or transceivers and associated communications hardware and logic. The network interface 114 is structured to allow the user device 101 to access and couple/connect to the network 106 to, in turn, exchange information with for example the enterprise computing system 102. That is, the network interface 114 is coupled to the processor 110 and memory 111 and configured to enable a coupling to the network 106. The network interface 114 allows for the user device 101 to transmit and receive internet data and telecommunication data. Accordingly, the network interface 114 includes any one or more of a cellular transceiver (e.g., CDMA, GSM, LTE, etc.), a wireless network transceiver (e.g., 802.11X, ZigBee, WI-FI, Internet, etc.), and a combination thereof (e.g., both a cellular transceiver). Thus, the network interface 114 enables connectivity to WAN as well as LAN (e.g., Bluetooth, NFC, etc. transceivers). Further, in some embodiments, the network interface 114 includes cryptography capabilities to establish a secure or relatively secure communication session between other systems such as the enterprise computing system 102, a second user device, the intermediary computing systems 103a-d, and/or any third-party computing system. In this regard, information (e.g., account information, transfer information, visualizations of the transfer information, financial data, and/or other types of data) may be encrypted and transmitted to prevent or substantially prevent a threat of hacking.

It should be understood that the user device 101 may include other structures with associated functionality as well. For example, the user device 101 and/or client application 151 may include location determination logic. The location determination logic determines the location of the user device 101 (e.g., for use by the client application 151). A user may opt-in to using the location determination logic to provide enhanced protection against fraudulent transactions, as described below. The location determination logic may use a satellite (GPS) sensor or cellular towers to determine the location coordinates of the user device 101 include a global positioning system (GPS) structured to at least one of determine or receive data indicative of the geolocation of the user device 101. This "location data" may provide an indication of a location of the user device 101.

The network 106 provides communicable coupling between the components of FIG. 1. The network 106 may include one or more of a local area network, a wide area, a wired network, and/or a combination of wireless and wired networks. Examples of network configurations include the Internet, a cellular network, Wi-Fi, Wi-Max, a proprietary banking network, etc. In some embodiments, the network 106 includes a proprietary banking network to provide secure or substantially secure communications. The network 106 is structured to permit the exchange of data, values, instructions, messages, and the like between and among various components of FIG. 1.

The enterprise computing system 102 is associated with an enterprise or provider institution. As mentioned above, in the example shown, the enterprise institution is a financial institution that is configured to retrieve information regarding a transfer from the user device 101 and the intermediary computing devices 103a-d. As shown, the enterprise institution computing system 102 is structured as one or more backend processing components, such as servers. The enterprise institution computing system 102 includes processing circuitry 120 including a memory device 123, and a network interface 124. The network interface 124 is structured to enable the enterprise computing system 102 to couple or connect to and to exchange information over the network 106 with, for example, the user device 101. The network interface 124 may be coupled to the processing circuitry 120 in order to enable the processing circuitry 120 to receiving and transmit messages, data, and information via the network 106.

The processing circuitry 120 is shown to include rendering logic 121, application programming interface (API) logic 122, and a memory 123. In some embodiments, the processing circuitry 120 may include one or more processors that are configured to communicate such that the processing circuitry 120 may perform or assist in performing any of the operations, steps, or methods discussed herein. The rendering logic 121 may be non-transitory machine-readable instructions stored thereon that when accessed and executed by the processor, cause the processor to perform, execute, or assist in executing any of the operations, steps, or methods discussed herein, for example, in regard to the generation of the interactive visualizations. As an example, the rendering logic 121 may include an executable program or application that has rules, particular procedures, or other logic therein that, when executed by the processor, enable the enterprise computing system 102 to perform or assist in performing the operations and methods regarding generating and providing the interactive visualizations discussed herein. The API logic 122 may be non-transitory machine-readable instructions stored thereon that when accessed and executed by the processor, cause the processor to perform, execute, or assist in executing any of the operations, steps, or methods discussed herein, for example, in regard to the determination of the intermediary computing systems 103a-d involved in a particular transfer and their associated API protocols.

The memory 123 may one or more tangible, non-transient volatile memory or non-volatile memory devices configured to digitally store information. In the example shown, the memory 123 includes an intermediary database 125 and a client database 126. The intermediary database 125 and the client database 126 are structured as repositories for information. In this regard, the client database 126 is configured to store, hold, and maintain information for a plurality of clients of the enterprise. For example, the client database 126 may store information such as client information (e.g., names, addresses, phone numbers, and so on), information regarding the user device 101 (e.g., mobile service identification number (MSIN), internet protocol (IP) address, etc.), or other information. The intermediary database 125 is configured to store, hold, and maintain information regarding the intermediary computing systems. For example, the intermediary database 125 is configured to store information regarding API protocols for each of the enterprise computing systems, the geographic location of each enterprise computing system, and/or network information such as IP addresses for each enterprise computing system. In this way, for example, the enterprise computing system 102 is able to use the information stored in the intermediary database 125 in order to communicate with each of the intermediary computing systems 103a-d. The intermediary database 125 is also configured to store historical information for each of the intermediary enterprises and/or agents thereof. For example, the intermediary database 125 may store historical information regarding the amount of time that respective intermediaries took to complete a transfer, information regarding the amount of time that a transfer took when a particular agents at the intermediary was associated with a transfer, information regarding transfers that the respective intermediaries failed to complete, etc. In this way, for example, the enterprise computing system 102 is able to access this historical information and employ artificial intelligence (AI) in order to provide a user with an estimated time for the transfer to complete and/or a probability of a successful completion of the transfer based on the intermediary computing systems involved in a transfer.

Figure 2:
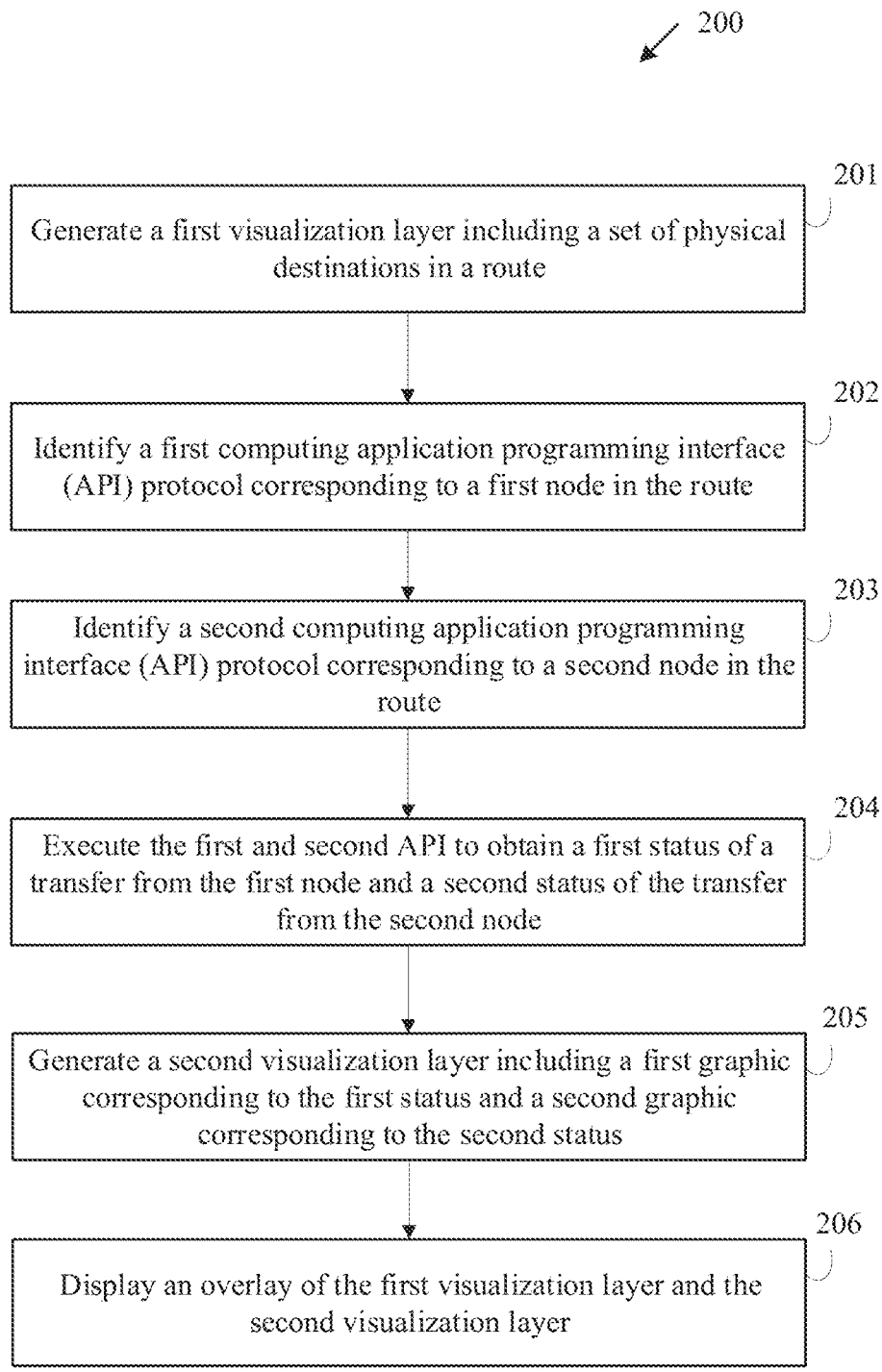
FIG. 2 is a flow diagram of a method of providing a visual display of a multi-destination transfer, according to various potential embodiments.

Referring now to FIG. 2, a flow diagram of a method 200 providing a visual display of a multi-destination transfer is shown according to an example embodiment. Because method 200 may be implemented using the components of FIG. 1, reference may be made to one or more components to aid explanation of method 200. Generally, method 200 relates to various processes implemented in order to provide a visualization of a multi-destination transfer to a user.

At process 201, a first visualization layer including a set of geographic or physical destinations in a route of a transfer is generated. The first visualization layer includes a first node, a second node, and a third node, each of the nodes corresponding to one of the set of geographic or physical destinations. For example, the first node may be a first terminal node corresponding to a first (terminal) enterprise computing system that initiates the transfer, the second node may be a transitional node corresponding to a first (transitional) intermediary computing system that receives the transfer from the first enterprise computing system and sends the transfer to a destination enterprise computing system corresponding to the third node (a second terminal node). Alternatively or additionally, the first visualization layer may include additional or fewer nodes each corresponding with an enterprise computing system of the set of geographic or physical destinations. For example, depending on the context of the transfer, the transfer may include additional intermediary computing systems.

In an embodiments, the enterprise computing system 102 generates the first visualization layer. The enterprise computing system 102 may be the same enterprise computing system associated with the first node. For example, in some embodiments as indicated above, the enterprise computing system 102 may be the enterprise computing system that is initiating the transfer. In this example, the enterprise computing system 102 receives a request from a user to initiate a transfer to a destination enterprise computing system. The enterprise computing system 102 may determine a route including one or more intermediary computing systems that need to be included on the route in order for the transfer to reach the destination enterprise computing system and begin the transfer by sending the transfer to a first of the intermediary computing systems.

In alternative embodiments, the enterprise computing system 102 may not be the enterprise computing system associated with the first node. For example, as indicated above, the enterprise computing system 102 may be a third party computing system that receives information regarding a transfer initiated at a first enterprise computing system. The information regarding the transfer may be received from a computing system of the first enterprise (e.g., a first intermediary enterprise 103a) and/or from the user device 101. That is, in a first example, the enterprise computing system 102 may be configured to provide a visualization service to the first enterprise computing system and, in response to the first enterprise computing system initiating a transfer, the first enterprise may transmit information regarding the initiated transfer to the enterprise computing system 102 that notifies the enterprise computing system that the transfer has begun. In this example, the information regarding the initiated transfer may include a transfer amount, the currency of the initiated transfer, a currency that the transfer should be received in, and/or information regarding the intermediary computing systems that will be involved in the transfer. Further in this example, the enterprise computing system 102 may determine the set of geographic or physical destinations in the route based on the information received from the first enterprise computing system. In a second example, a user may access the enterprise application 151 on the user device 101, enter in information regarding a transfer initiated at a first enterprise computing system that the user requested, and request the enterprise computing system 102 to generate a visualization of the transfer. In this example, in response to receiving the request, the enterprise computing system 102 may determine the initiating computing system, the intermediary computing systems, and the destination computing system either based on information in the request or dynamically through various API calls in order to determine the set of geographic or physical destinations in the route.

At process 202, a first API protocol corresponding with the first node is identified and a second API protocol corresponding with the second node is identified. For example, the enterprise computing system 102 determines a first computing system associated with the first node based on information regarding the transfer. The enterprise computing system 102 may then cross-reference the first computing system within the API database 125 in order to determine a first API protocol that enables the enterprise computing system 102 to retrieve information from the second computing system. Similarly, the enterprise computing system 102 determines a second computing system that is associated with the second node. The enterprise computing system 102 may cross-reference the second computing system within the API database 125 in order to determine a second API protocol that enables the enterprise computing system 102 to retrieve information from the second computing system.

Additionally or alternatively, in the example where the enterprise computing system 102 is involved in the transfer as either the initiating computing system (e.g., the first enterprise computing system), an intermediary computing system, or the destination computing system, the third node may correspond to the enterprise computing system 102 and an API protocol for the third node is not identified. Rather, the enterprise computing system 102 may leverage information stored or received as part of the transfer in order to determine a third status of the transfer, where the third status of the transfer is associated with the third node (e.g., the enterprise computing system 102). However, in the example where the enterprise computing system 102 is not involved in the transfer (e.g., is a third party to the transfer process), the enterprise computing system 102 may also identify a third API protocol corresponding to the third node that enables the enterprise computing system 102 to retrieve information from a third computing system (e.g., a third intermediary computing system 103*c*) corresponding to the third node. Additionally or alternatively, the enterprise computing system 102 may determine API protocols corresponding to additional nodes depending on the particular context of the transfer.

At process 203, the first API protocol is executed to obtain a first status of the transfer from the computing system associated with the first node and the second API protocol is executed to obtain a second status of the transfer from the computing system associated with the second node. Each API protocol corresponding to a computing system may comprise an API specific to the computing system, and one or more specifications on using the specific API to make API calls or API requests to that computing system. The specifications may identify, for example, how a request is to be formatted (e.g., how the requested data is to be identified), how the computing system making the API request identifies and verifies its identity (e.g., authenticates itself using permanent, temporary, or single-use passcodes, authentication tokens, etc.), timing of API requests, how other relevant user devices or computing systems are identified, and/or other information required in making a proper, suitable, or acceptable API request. In various embodiments, other protocols may be used in addition to API protocols, such as requesting sensor readings, imagery, video, sound, GPS coordinates from GPS devices, RFID, wireless communications (e.g., near-field communications (NFC), W-Fi, "Bluetooth") etc., from devices located at the various nodes. For example, a first protocol may involve requesting data from first and second devices at a first node, and performing specific analyses on the data to generate information on an item being transferred. For example, an API protocol may be implemented by the enterprise computing system for a first node, and a second protocol (e.g., using GPS coordinates corroborated by, e.g., image analysis for visual confirmation or wireless detection of a communications device or tag on an item at a node, or detection of its movement away or toward a node) may be implemented for a second node.

At process 204, a second visualization layer is generated that includes a first graphic corresponding with the first status, a second graphic corresponding with the second status. In some embodiments, in the example where the enterprise computing system 102 is also involved with the transfer, the enterprise computing system 102 may generate a third graphic corresponding to the third status of the transfer, where the information in the third status was accessed or retrieved locally at the enterprise computing system 102. Alternatively or additionally, in the example where the enterprise computing system 102 is not involved in the transfer process, a third graphic corresponding to a third status obtained from executing the third API protocol may also be generated. In some embodiments, the number of statuses of the transfer obtained and corresponding graphics that are generated are dependent upon the context of the transfer and the number of destinations included with the set of geographic or physical destinations in the route of the transfer.

At process 205, an overlay of the first visualization layer with the second visualization layer is displayed such that at least two nodes in the set of destinations are displayed such that at least two nodes in the set of destinations are displayed in association with the first and second graphics. For example, in an embodiment, the enterprise computing system 102 may provide the first visualization layer and the second visualization layer to the user device 101 that is configured to display an overlay of the first and second visualization layers. In some embodiments, the enterprise computing system 102 is configured to render/generate the overlay of the first and second visualization layers in a single graphical user interface (GUI) and provide the GUI to the user device 101 to display. That is, in various embodiments, the user device 101 may be configured to perform various processes to render the overlaid visualization to the user. In some embodiments, the enterprise computing system 102 renders the overlaid visualization and transmits the information regarding the visualization to the user device 101 that then displays the rendered visualization. The visualization is configured to graphically depict to the user the current status of the transfer including the intermediary (e.g., the node) that is currently in possession of the transfer.

Moreover, as discussed in further detail below, the visualization, in particular, the second visualization layer may include additional information that is determined using AI or estimation made by the enterprise computing system 102. For example, the enterprise computing system 102 may access historical information regarding the enterprise computing systems associated with each of the nodes in order to determine or estimate a time that the transfer will be completed by. For example, the first status may indicate that the first node received the transfer at a first time and the transfer to the second node has not yet occurred. The enterprise computing system 102 may access the historical information regarding a first computing system of the first node and calculate an average amount of time that the computing system usually takes in processing the transfer to a second computing system of the second node. Moreover, the enterprise computing system 102 may access the historical information regarding the second computing system of the second node to determine an average amount of time that the second computing system of the second node usually takes to process the transfer to a third computing system associated with the third node. The enterprise computing system 102 may then generate another graphical representation of an estimated transfer completion date or time for the second visualization layer. In other embodiments, the enterprise computing system 102 may also generate, based on the historical information, a probability score indicative of the likely success or failure of the transfer and/or other estimations using AI or machine learning. The enterprise computing system 102 may then store the obtained statuses within the API database in order to continue building the historical information data base for future estimations.

The enterprise computing system 102 may also be configured to access the historical information in order to calculate a probability of how long the transaction should that and a probability score of the chance that the transfer will be successful. For example, the enterprise computing system 102 may be configured to implement a machine learning algorithm using the historical data points of past transfers in the database. The machine learning algorithm may compare similar transactions to the present transaction and search for any abnormalities (e.g., inconsistencies) therebetween. Moreover, the machine learning algorithm may calculate a risk score for particular intermediary computing systems or individuals based on similar previous transactions. For example, the machine learning algorithm may flag to the user that a particular node or enterprise computing system with the node has a 50% chance of successfully completing the transfer based on similar transactions not being completed half of the times attempted. A node having a low probability score of success (e.g., has a history of not completing transfers) may be holographically or otherwise visually displayed on the user device as part of the rendered visualization (e.g., the second visualization layer) to identify the node presenting the issue (e.g., delay).

The enterprise computing system 102 may also provide on the second visualization layer a real-time market update (e.g., a display of real time currency trade ratios) such that the user is able to make the transfer that includes the exchange rates at the best value for the user. In various embodiments, the enterprise computing system 102 may employ machine learning based on monitored market data to provide suggestions to the user of when the best time to initiate the transfer is. For example, the machine learning algorithm may monitor the historical price fluctuations between the U.S. Dollar and the Euro to determine that at noon central daylight time is the best time to make a transfer to a person or entity in the Eurozone. More particularly, the machine learning algorithm may calculate based on detected patterns between the U.S. Dollar and the Euro and the amount of the transfer, that the user could save a certain amount of funds (e.g., $15) by initiating the transfer at a particular time as opposed to immediately. In some embodiments, the machine learning algorithm may access information regarding past transfers of the user and provide a learning graphic to the user (e.g., via the second visualization layer or a third visualization layer) that indicates to the user that funds could have been saved or more value could have been transferred had the user selected to initiate the transfer at particular times of the day or month. In this way, the learning graphic may be referenced by the user in order to allow the user to determine the best time to initiate transfers in the future.

In another example, the visualization including the first and second visualization layers may include information regarding multiple transfers. For example, a user may have multiple international transfers pending at one time. The first visualization layer may include a first, second, and third node corresponding to a first of the multiple transfers and a fourth, fifth, and sixth node corresponding to a second of the multiple transfers. The visualization generated or rendered by the enterprise computing system 102 may include connectors between each of the nodes with corresponding graphical representations of the respective statuses for each the first and second transfers. In this way, the enterprise computing system 102 is able to provide a complete visualization to the user of the progress or status of their multiple transfers. If one or more of the transfers has a probability score of a successful completion below a threshold (e.g., 70%), then the second visualization layer may include a graphical representation of a warning that is configured to indicate to the user that the particular transfer is high risk. Accordingly, the user may be able to interact with the visualization to identify the particular node that is high risk in order to attempt to avoid that node in future transactions.

Figure 3:
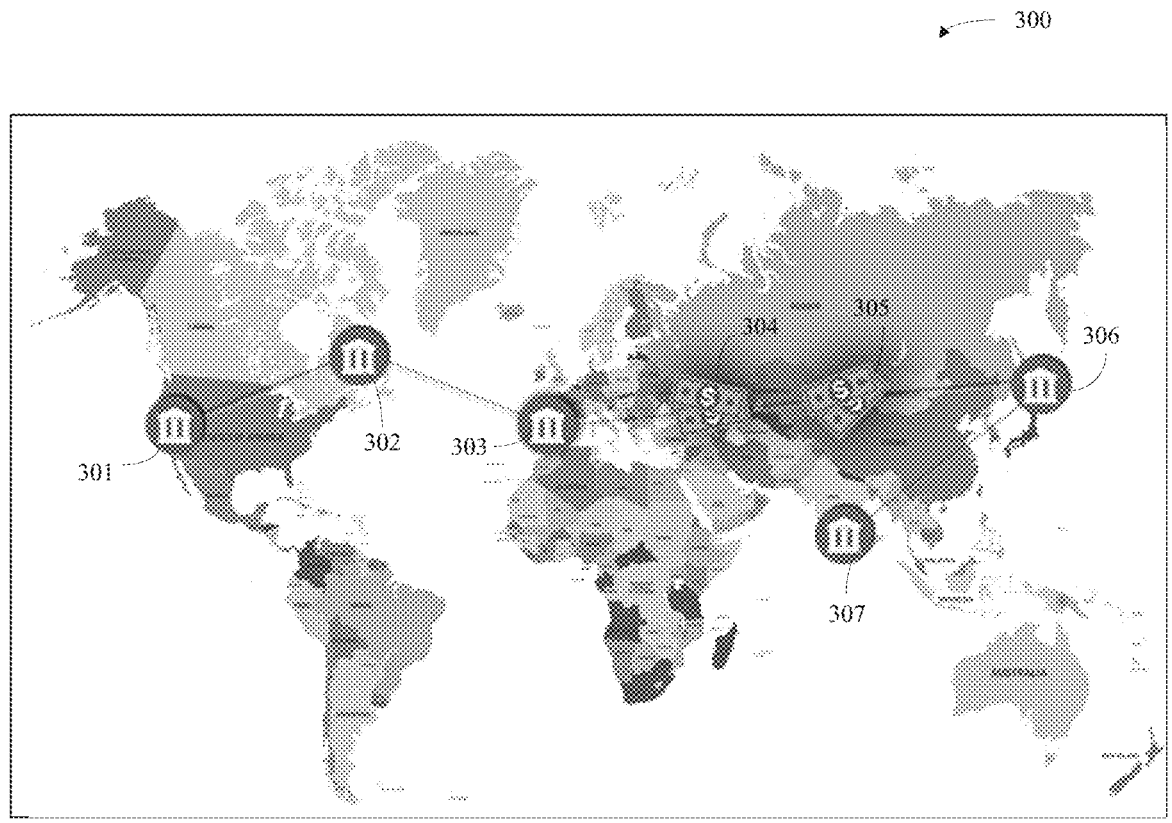
FIG. 3 is an example of a first visualization layer, according to various potential embodiments.

Referring now to FIG. 3, an example of a first visualization layer 300 is shown, according to an exemplary embodiment. The first visualization layer 300 includes set of geographic or physical destinations along a route of a transfer. The set of geographic or physical destinations include a first node 301, a second node 302, a third node 303, a fourth node 304, a fifth node 305, a sixth node 306, and a seventh node 307 visually rendered on a geographic map. The nodes 301-307 each represent a respective destination along a route on which a particular transfer will travel. For example, the first node 301 (a first terminal node) represents the initiating computing system (a first terminal computing system), the second through sixth nodes 302-306 (transitional nodes) represent intermediary or transitional computing systems, and the seventh node 305 (a second terminal node) represents the destination computing system (second terminal computing system). In this example, the initiating node 301 is depicted to be located in San Francisco of the United States. A user initiates a transfer from the initiating computing system associated with the first node 301 using, for example, a client application 151 associated with the initiating computing system of the first node 301. The transfer includes an indication of the destination computing system associated with the seventh node 307 (e.g., a routing number to the destination enterprise), an amount to be transferred, and/or an account number at the destination computing system that is to receive the amount of the transfer. However, as depicted the destination may be located in India and in order for the transfer to be completed, the funds associated with the transfer must travel through the intermediary computing systems in order to reach the account at the destination computing system. In some embodiments, in the example where the enterprise computing system 102 is not a participating entity of the transfer, a computing system of the entity associated with the first node 302 may map out all of the intermediary computing systems (e.g., and thereby the intermediary nodes 302-306) and transmit that information to the enterprise computing system 102 to generate the first visualization layer. In the example where the enterprise computing system 102 is the initiating computing system associated with the first node 301, the enterprise computing system 102 may automatically determine the nodes for the first visualization based on stored information regarding the route that a transfer must follow in order to reach the destination computing system (e.g., the seventh node 307). Once the enterprise computing system 102 has determined, based on the initiating computing system and destination computing system in the request, the intermediary computing system (e.g., the nodes 302-306) that the transfer will follow on its route from the initiating computing system (e.g., the first node 301) to the destination computing system (e.g., the seventh node 307), the enterprise computing system 102 then generates the first visualization layer based on the known (e.g., cross-referenced) geographic location of the computing systems associated with each node 301-307.

Moreover, each of the nodes 301-307 have respective computing systems (e.g., intermediary computing systems 103a-d) that the enterprise computing system 102 is able to identify based, for example, on information stored in the API database 125 regarding each of the computing systems. In this way, the enterprise computing system 102 is able to identify an API protocol in order to communicate with the computing systems associated with each of the nodes and retrieve information regarding the transfer. In some embodiments, the API protocol for each of the intermediary computing systems 103a-d are unique. The enterprise computing system 102 can then ping or execute the API protocols by sending a request for information regarding the transfer, and each of the intermediary computing systems 102 can send back the information requested according to the respective API protocol. The first visualization layer 300 also includes various connectors 310 (or other links or graphical indicators) between each of the nodes 301-307 that indicate the route that the transfer is anticipated or has occurred. In some embodiments, the connectors 310 may also be used to visually indicate the status of the transfer. For example, a solid connector (e.g., a solid line or arrow) may be used between two nodes to visually indicate to the user that the transfer has already taken place between the two connected nodes along the route. Continuing the example, a dashed connector (e.g., a non-solid line or arrow) may be used between two or more nodes to visually indicate to a user that the transfer between those two or more nodes has yet to occur. In this way, the first visualization layer may indicate to the user the current location of the transfer without displaying additional information.

Figure 4:
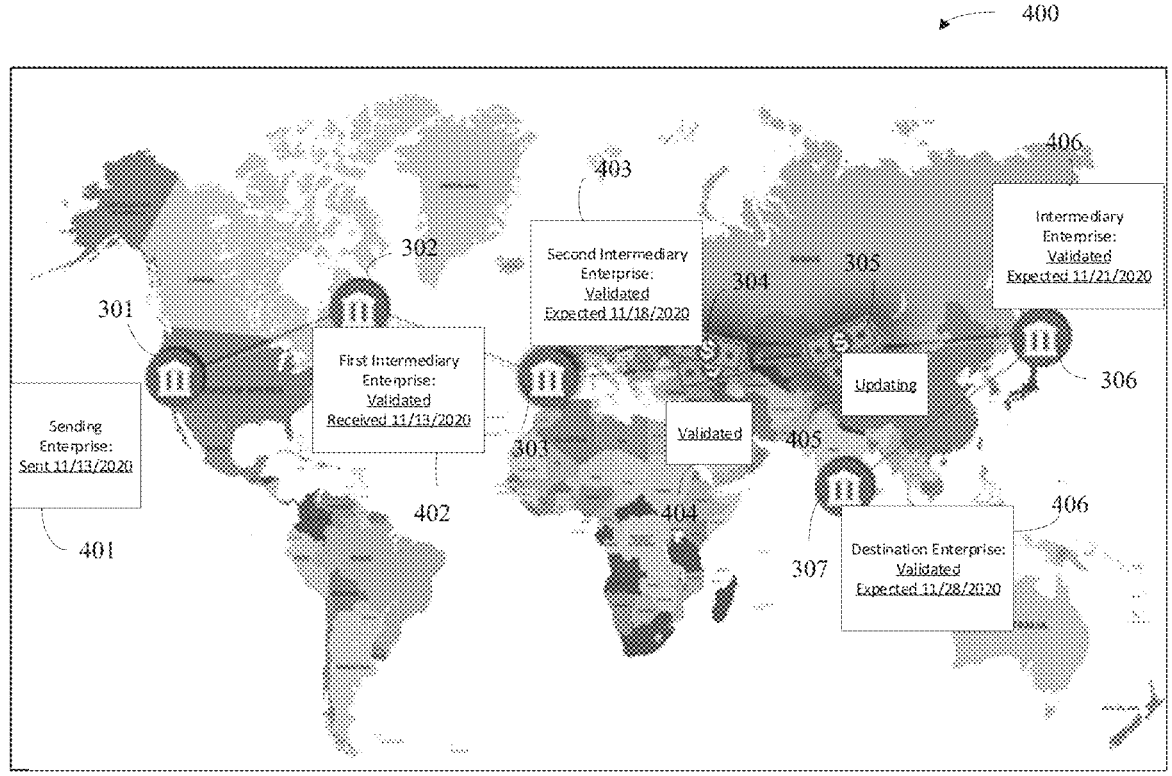
FIG. 4 is an example of a rendered visualization of a multi-destination transfer, according to various potential embodiments.

Referring now to FIG. 4, an example of a rendered visualization 400 including the first visualization layer and a second visualization layer, according to an exemplary embodiment. As an example, the rendered visualization includes an overlay of the first visualization layer 300 as depicted in reference to FIG. 3 with a second visualization layer including a graphical representation of a transfer status for each of the nodes 301-307. In particular, the second visualization layer includes a first graphic 401 that indicates a first transfer status at the first node 301, a second graphic 402 that indicates a second transfer status at the second node 302, a third graphic 403 that indicates a third transfer status at the third node 303, a fourth graphic 404 that indicates a fourth transfer status at the fourth node 304, a fifth graphic 405 that indicates a fifth transfer status at the fifth node 305, a sixth graphic 406 that indicates a sixth transfer status at the sixth node 306, and a seventh graphic 407 that indicates a seventh transfer status at the seventh node 307. Each of the transfer statuses were retrieved, for example, by executing an API protocol for each of the nodes 301-307. The enterprise computing system 102 generates the graphics 401-407 using the information retrieved and overlays the graphics 401-407 in a manner that indicates to a user that each of the graphics 401-407 are associated with the respective node 301-307. For example, the first and second visualization layers are rendered and overlaid in a configuration that places each graphic 401-407 near the respective node 301-307 such that a user can intuitively visualize the transfer.

Moreover, the rendered visualization 400 may be interactive such that a user can selectively retrieve additional information regarding the transfer. For example, the first node 301 and/or the first graphic 401 may be selectable via a user input. Once selected, the rendered visualization 400 may update to display more information regarding the transfer at the computing system associated with the first node 301. In this example, once the first graphic 401 is selected, the rendered visualization may zoom into the geographical area associated with the first node (e.g., California) and display a larger first graphic 401 that includes additional information of the transfer at the first node such as an agent at the first node 301 that is assigned to the transfer, a phone number or other contact information for the computing system associated with the first node, a date that the transfer was received, a date that the transfer was sent to the next node, an amount and currency of the transfer received, and/or an amount and currency of the transfer that was sent to the next destination (e.g., the second node 302) along the route. Similarly, the other graphics 402-407 or nodes 302-307 may also be selectable to provide similar information to the user when selected. In another example, the user, via an input to the user device 101, may be able to zoom into or out of the visualization such that only particular nodes 301-307 and respective graphics 401-407 of the rendered visualization are displayed on the user device 101.

In some embodiments, the user device 101 includes one or more sensors 117 that allow for user inputs via the user device 101. The one or more sensors 117 may include various cameras, detectors, light sources, and or other electronic equipment configured to capture one or more user inputs. In some embodiments, the one or more sensors 117 include an eye tracking system, a gesture or proximity sensing system, a depth sensing system, a touch screen, and/or a combination thereof. For example, a user input may include a user selection on a touch screen, a click from a mouse or keyboard, a verbal command received at a microphone, a hand gesture determined by a camera, or an eye gesture determined by an eye tracking device of the user device 101. In an example of the user device 101 include AR glasses, the rendered visualization may be displayed on a display as a hologram such that the user can see the surrounding area and the rendered visualization 400. The AR glasses may include an eye tracking system comprising one or more light sources, detectors, and/or other optical devices. The AR glasses may also include one or more outward facing sensors such as cameras that are configured to sense and determine gestures such as hand gestures made by a user. The user may interact with the rendered visualization 400 by, for example, by verbal commands, hand gestures, or eye gestures. An example of such interaction is described below in reference to FIG. 6.

Figure 5:
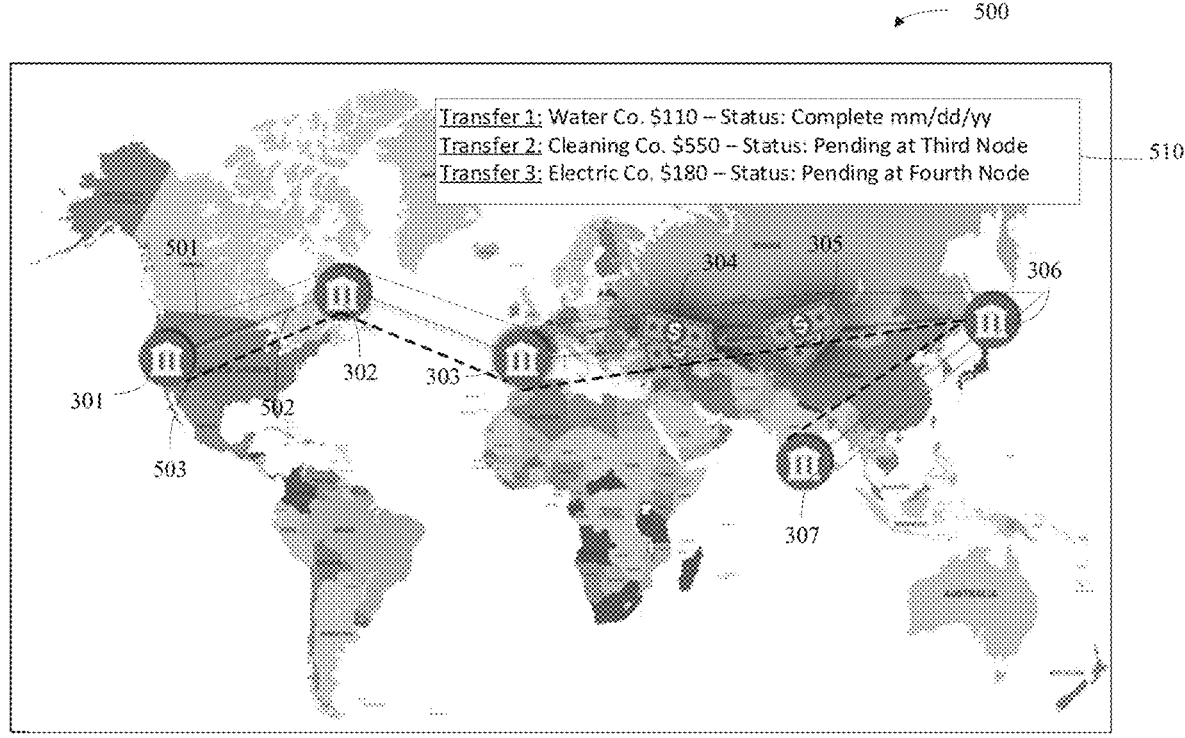
FIG. 5 is a second example of a rendered visualization of a multi-destination transfer, according to various potential embodiments.

Referring now to FIG. 5, a second example of a rendered visualization 500 including the first visualization layer and a second visualization layer, according to an exemplary embodiment. The second example of the rendered visualization 500 is similar to the rendered visualization 400 described in reference to FIG. 4. However, the second example of the rendered visualization includes multiple transfers along the route of the nodes 301-307. It is to be appreciated that this is only one example of a rendered visualization that includes information regarding multiple transfers. For example, in other embodiments, it is contemplated that multiple transfers, each having a different route with multiple various nodes or destinations associated with each may be rendered in various embodiments.

The rendered visualization 500 includes a first visualization layer that includes the seven nodes 301-307 with a first connector 501, a second connector 502, and a third connector 503 therebetween. The first connector 501 is indicative a first transfer (e.g., transfer 1) initiated via a user device to a water company computing system in India having an account at the destination computing system (e.g., the seventh node 307), the second connector 502 is indicative of a second transfer (e.g., transfer 2) initiated via a user device to a cleaning company computing system in India having an account at the destination computing system, and the third transfer (e.g., transfer 3) is indicative of a third transfer initiated via a user device to an electric company computing system having an account at the destination computing system.

The second visualization layer of the rendered visualization 500 includes a status graphic 510 with the information for each transfer. For example, the status box 510 may include a name or identifier of the recipient for the first transfer (e.g., Water Co.), a transfer amount (e.g., $110), a status (e.g., completed), and/or a date associated with the status. Moreover, the status box 510 may include a name or identifier of the recipient for the second transfer (e.g., Cleaning Co.), a transfer amount (e.g., $550), a status (e.g., Pending at the third node 303), and/or a date indicating the last update. Additionally or alternatively, the status box 510 may include a name or identifier of the recipient for the third transfer (e.g., Electric Co.), a transfer amount (e.g., $180), a status (e.g., Pending at the fourth node 304), and/or a date indicating the last update. In various embodiments, the status box 510 may also include an estimated completion date and/or a probability score that the transfer will be successful determined based on historical information regarding similar transfers stored at the enterprise computing system. Moreover, in various embodiments, the second visualization layer of the rendered visualization 500 may also include one or more graphics for each of the transfers similar to the graphics 401-407 described in reference to FIG. 4.

Similar to the rendered visualization 400 as described in reference to FIG. 4. The rendered visualization 500 may also be interactive or update based on one or more user inputs. For example, the rendered visualization 500 may be displayed to a user and the user may issue a voice command of "Show me transfer 1." In response to a microphone of the user device 101 receiving the voice command, the rendered visualization 500 may update to show only information related to the first transfer. This updated rendered visualization may be similar to the rendered visualization 400 of FIG. 4. Further, the user device 101 may receive or detect additional user inputs that update the display to show more or less information based on the detected user input or gestures.

Figure 6:
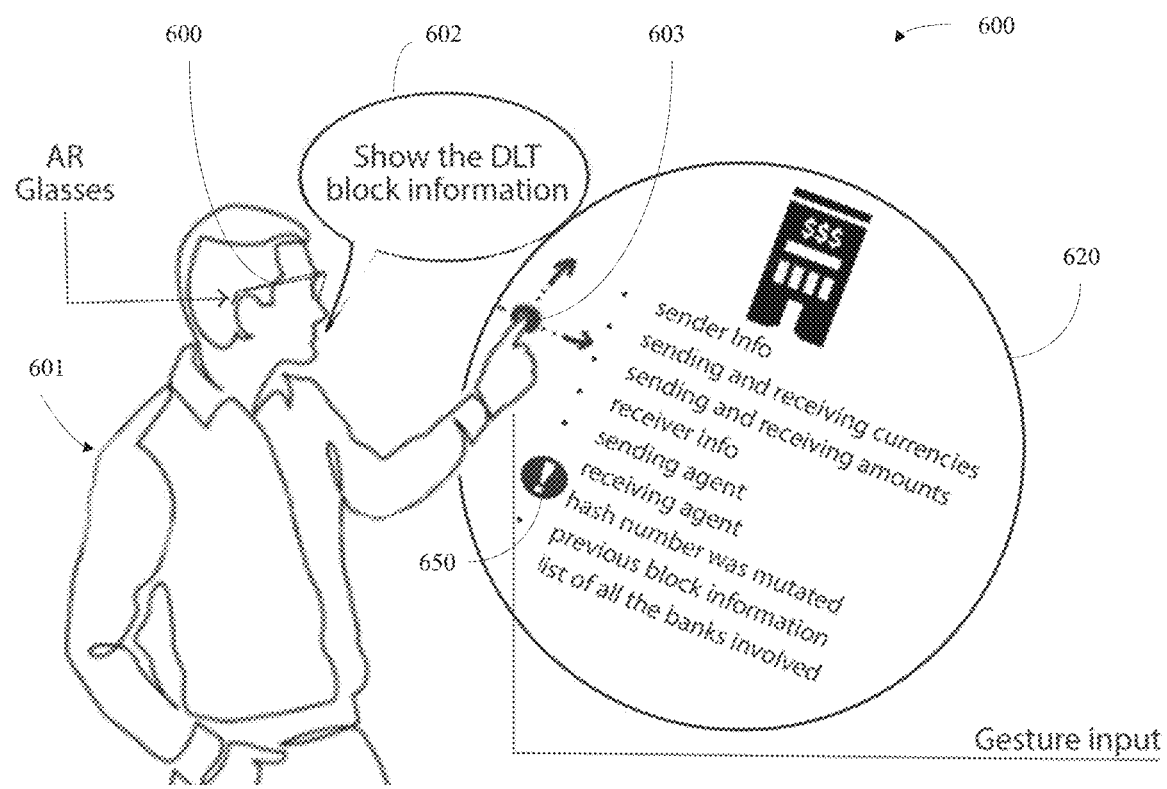
FIG. 6 is an example of an updated visualization of a multi-destination transfer based on a user input, according to various potential embodiments.

Referring now to FIG. 6, depicts an updated visualization 600 updated based on a user input, according to an exemplary embodiment. More particularly, the FIG. 6 depicts a user 601 interacting with the visualization via the user device 101 (e.g., AR glasses 610) with a voice command 602 and a hand gesture 603. For example, a rendered visualization such as the rendered visualization 400 or 500 was displayed on a display of the AR glasses 610. The user 601 via a hand gesture 603 detected by a gesture tracking system (e.g., including outward facing cameras) selected on a particular node (e.g., second node 310), which caused the rendered visualization 600 to update and show more particular information 620 about a transfer at the particular node. In this example, the more particular information includes the sender information, sending and receiving amounts and currencies, the receivers information, an agent associated with the transfer at the sending entity, an agent associated with the transfer at the receiving entity, and information regarding a distributed ledger. In this example, the information regarding the distributed ledger includes a warning 650 that the hash number in the ledger was mutated and also includes information regarding previous block information and/or a list of all of the entities that have been or will be involved with the transfer. In some embodiments, the intermediary computing systems may create a block hash using similar methodologies to the one deployed by initiating computing system (e.g., using bank credentials of the user) in order to check that the original block (e.g., created by the initiating computing system and received by the intermediary computing system) was not mutated or changed. This check may occur at each intermediary computing system and the destination computing system, if one or more of the intermediary computing system or the destination computing system determine that a hash was mutated from its original form, that respective computing device may flag the transaction with the warning 650 and transmit the warning 650 to the enterprise computing system 102 in response to the execution of a respective API protocol. In some embodiments, the enterprise computing system 102 may generate a warning based on one or more rules. In the example depicted, the enterprise computing system 102 may compare the block information (e.g., the hash numbers in the ledger) received from a first node 301 (e.g., received in response to executing the first API protocol) with the block information (e.g., the hash numbers in the ledger) and issue a warning on the rendered visualization if there is an unexpected value therein.

Further, the user 601 may issue a voice command 602 that is detected by one or more microphones of the AR glasses 610 that causes the visualization to respond. For example, the user 601 in this example issues a voice command 602 of "show the distributed ledger technology block information." In response to the voice command 602, the AR glasses 606 and/or the enterprise computing system 102 may work together to update the visualization to display detailed information regarding the blocks of information associated with the distributed ledger such as the hash number or the previous block information that was used at the prior nodes. In this way, at any moment, the user will be able to see the full distributed ledger technology with detailed block information including the hash number, previous block information from other users at the enterprise associated with the enterprise computing system 102, and/or a list of all of the entities or enterprises involved in the transfer.

As alluded to above, the enterprise computing system 102 may be used to generate and provide a visualization of a multi-destination transfer in order to make the transfer process as transparent as possible for the user. In various examples, the multi-destination transfer includes an industry standard international wire transfer. In other examples, the multi-destination transfer includes multi-destination transfers with cryptocurrencies or distributed ledgers. In the case of cryptocurrencies and/or distributed ledgers, each computing system involved in the transfer (e.g., transactional root) will create their own secure distributed ledger technology (DLT) block that is configured to be checked with a DLT transaction block of the previous computing system. The created DLT block is a newly encrypted DLT block with information regarding the previous DLT transaction block. For example, if a user 601 is sending a transfer from San Francisco to London through an intermediary bank in New York, the transfer will include a first encrypted DLT block created at the first computing system in San Francisco, a second encrypted DLT block created at the second computing system in New York, and a third encrypted DLT block at the third computing system in London. The various methods and systems described herein allow for the enterprise computing system 102 to dynamically retrieve information regarding the first, second, and third DLT blocks in order to generate a rendered visualization to display to a user, thus making the process transparent and more secure. That is, for example, the exact information that is received, requested, accessed, or retrieved as part of the statuses of the transfer are dependent on the context and type of transfer that is being monitored. Accordingly, the systems and methods described herein improve the ability of a computing system to monitor and track multi-destination transfers and also improve the ability of the computing system to interact and provide information to a user regarding transfers that would typically be obfuscated.

Figure 7:
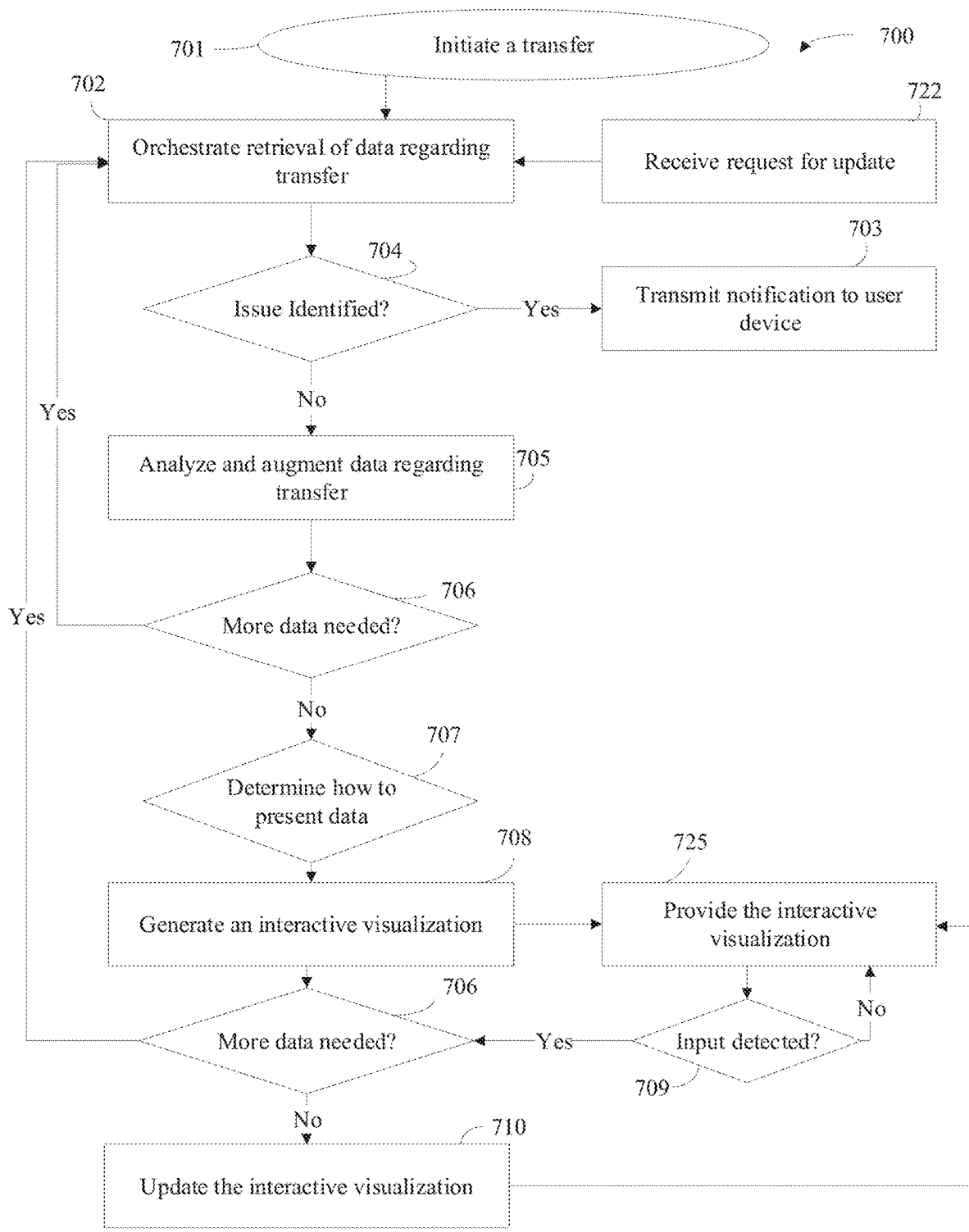
FIG. 7 is a flow diagram of a method of generating and updating a multi-nodal transfer, according to various potential embodiments.

Referring now to FIG. 7, depicts a flow diagram of a method 700 of generating and updating a multi-nodal transfer, according to an exemplary embodiment. Because method 700 may be implemented using the components of FIG. 1, reference may be made to one or more components to aid explanation of method 700. Generally, method 700 relates to various processes implemented in order to provide a multi-layered visualization of a multi-node (e.g., multi-destination) transfer to a user.

At process 701, a transfer is initiated. As alluded to above, in some embodiments, the transfer may be initiated at a first computing system and the system providing the visualization may be a separate enterprise computing system. Alternatively or additionally, in some embodiments, the transfer may be initiated at the first enterprise computing system and the first enterprise computing system may also be involved in the transfer. For example, the first enterprise computing system may be the enterprise computing system initiating the transfer or otherwise a part of the transfer process (e.g., a computing system associated one of the nodes). In the first example, where the first enterprise computing system is different from the system providing the visualization. The enterprise computing system 102 may receive an indication and/or details of the transfer in response to a user enrolling (e.g., via a web interface on the user device 101 or otherwise) as a user of services provided by the enterprise computing system 102. For example, the enterprise computing system 102 may receive a form or application from a user device 101 in response to a user navigating to a web page associated with or provided by the enterprise computing system 102. In response to approving the enrollment of the user, the enterprise computing system 102 may store profiling data (e.g., history of transfers, current transfers, name, address, etc.) to a data instance for the user within the user database 126. In various embodiments, the user may enter information regarding particular transfers or enterprises that the user has initiated transfers with. For example, the user may enter online login credentials for an entity that the user initiates transfers with. In such an example, the enterprise computing system 102 may establish an API session via executing an API protocol with a computing system of the entity in order to retrieve data regarding initiated transfers for the user (e.g., using the online login credentials). The enterprise computing system 102 may then store, within the data instance associated with the user (e.g., user profile) in the user database 126, the retrieved information. Alternatively or additionally, the enterprise computing system 102 may receive information regarding transfers directly from the user via a GUI presented on the user device. In this example, the user device may be used to provide information such as a routing, an amount of transfer, a Society for Worldwide Interbank Financial Telecommunications (SWIFT) code, an International Bank Account Number (IBAN) of the initiating enterprise and/or destination enterprise, or other information that can be leveraged by the enterprise computing system 102 to identify a particular transfer and/or intermediary enterprises involved in the transfer. In the example where the enterprise computing system 102 is associated in the transfer, the enterprise computing system 102 may be able to retrieve information regarding transfers for a user by accessing the user database 126 and analyzing the transaction history of the user. In some embodiments, the enterprise computing system 102 accesses, receives, (e.g., via an API call) or searches for (e.g., via analyzing the user profile in the user database 126) the transfer information in response to a user request received from, for example, the user device 101 at process 722. It is to be appreciated that the transfer information accessed or retrieved at this process provides the enterprise computing system 102 with "seed transfer information." The seed transfer information is merely an indication that a transfer has been initiated or that past transfers have occurred. The seed transfer information may include some details received from the user or another computing system associated with initiating the transfer that allows the enterprise computing system 102 to find and retrieve any remaining data regarding the transfer from other entities involved in the transfer. However, additional information regarding the transfer beyond the seed transfer information may be needed for the visualization.

At process 702, either in response to receiving or accessing the seed transfer information (or, in response to a request received from the user device 101 at process 722), additional data regarding the transfer is orchestrated. For example, process 702 relates to various techniques, processes, and operations of the enterprise computing system 102 in collecting information regarding the transfer from each of the computing systems involved in the transfer.

In various embodiments, the enterprise computing system 102 analyzes the seed transfer information to determine particular intermediary computing devices 103*a-d* that will be a part of the transfer. For example, the enterprise computing system 102 may cross-reference within a database the seed transfer information (e.g., initiating enterprise, destination enterprise, type of transfer, etc.) to determine the intermediary computing devices 103*a-d* that will be associated with the transfer. Alternatively or additionally, the enterprise computing system 102 may request information regarding the identity of the intermediary computing systems that will be involved in the transfer via an API call to a third party computing system (e.g., a computing system of a regulator for the particular type of transfer) or the initiating computing system. In some embodiments, the identity of each of the intermediary enterprises may be manually entered, for example, by an agent or the user and the computing systems associated therewith automatically identified.

Once the intermediary computing systems 103*a-d* are identified, the enterprise computing system 102 retrieves contact information for each of the intermediary computing systems. For example, the contact information may include an API protocol for each of the intermediary computing systems 103*a-d* associated with the transfer. The contact information may be retrieved by the enterprise computing system 102, for example, by cross-referencing each of the intermediary computing systems within the intermediary database 125. The enterprise computing system 102 may use the contact information to request the information regarding the transfer at each particular intermediary computing system. The information regarding the transfer may be similar to the information retrieved via the API sessions described above in reference to FIG. 2.

In various embodiments, the enterprise computing system 102 is only able to identify a first intermediary computing system 103a. That is, the enterprise computing system 102 may communicate with the initiating computing system (e.g., which, in some embodiments, may be the enterprise computing system 102 itself) to identify the first intermediary computing system 103a based on information of how the transfer was initiated from the initiating computing system. In this example, the enterprise computing system 102 may communicate with the first intermediary computing system 103a via an API call and request data regarding the transfer similar to as described above. In response, the enterprise computing system 102 receives requested the data regarding the transfer along with an indication of the first intermediary computing system 103a will be making or has made the transfer to. The enterprise computing system 103a may continue to communicate with each subsequent intermediary computing system until the destination computing system is reached.

At process 704, a decision whether an issue has been identified is made. If an issue is identified, the enterprise computing system 102 generates and transmits a notification to, for example, the user device 101 to notify the user or to a personal computing device associated with the enterprise computing system 102 to notify an agent at process 703. If no issue is identified, then the enterprise computing system proceeds to process 705. An issue may include a failure to identify one or more intermediary computing systems 103a-c, an indication in the information regarding the transfer received from one or more of the intermediary computing systems 103a-c that the transfer has stopped, stalled, or failed, or a failure to identify an initiated transfer and/or seed transfer information, and so on. The notification at process 703 may include a text message, e-mail message, push notification, and/or a GUI that contains textual information indicative of the identified issue.

At process 705, the data regarding the transfer from at least the initiating computing system and one of the intermediary computing systems 103a is analyzed and augmented. For example, the enterprise computing system 102 performs one or more machine learning algorithms similar to as described above with the information regarding the data as inputs. In various examples, the enterprise computing system 102 may estimate a completion time or date for the transfer based on a current status determined from the transfer information and historical information accessed from a database. Similar to as described above, the enterprise computing system 102 may determine an average amount of time that each of the intermediary computing system have taken in previous transfers to complete, determine the intermediary computing system that the transfer has yet to pass through, and sum the averages for each of the remaining intermediary computing system to estimate the completion time or date for the transfer to complete. Moreover, the historical information may be used to create other predictive models of the transfer such as a probability of success, suggestions of times to perform the transfer, and/or other suggestions based on artificial intelligence algorithms using the historical information similar to as described above.

In various embodiments, the enterprise computing system 102 may not have an API protocol that enables the enterprise computing system 102 to communicate with one or more of the intermediary computing systems 103a-d. In this example, the enterprise computing system 102 may determine based on historical data and/or information accessed from one or more other intermediary computing systems 103b-c the statistical information of the inaccessible intermediary computing system 103a. In some embodiments, the statistical information may include information such as the time that a particular historical transfer was received by the inaccessible intermediary computing system 103a, when the transfer was received by a successive intermediary computing system or destination computing system, the times that transfers failed or never left the inaccessible intermediary computing system 103a, and/or context regarding each of the past transfers. The enterprise computing system 102 may then model the inaccessible intermediary computing system 103a in order to create a prediction for future transactions at the inaccessible intermediary computing system 103a based on a calculated average time that the inaccessible intermediary computing system 103a takes to process the transfer, the probability of a successful transfer at inaccessible intermediary computing system 103a, and/or other contextual information of the past transfers.

At process 706, a determination whether additional data regarding the transfer is needed. For example, the enterprise computing system 102 determines whether additional data for the machine learning algorithms and/or the transfer are needed for the visualization. The additional data may include the need for contact information (e.g., telephone number, email, website, etc.) for an agent at one or more intermediary computing systems, additional details regarding the status of the transfer being processed at an intermediary computing system, and/or details regarding the transfer such as a currency exchange rate (e.g., if currency was exchanged at one or more of the intermediary enterprises). For example, the status of the transfer received from one of the intermediary computing system may be "pending." The enterprise computing system 102 may determine that, based on historical averages, the transfer has been pending for an unusual amount of time (e.g., a standard deviation above the historical average). In response, the enterprise computing system 102 may determine that additional data regarding the transfer and, in particular, the status of the transfer at the one intermediary computing system. In response, the enterprise computing system 102 may proceed to process 702 to procure the additional data. In this example, the enterprise computing system 102 may transmit a request via an API call or by other methods such as an automatically generated e-mail to the intermediary computing system 103 requesting for an update regarding the status and prompt the intermediary computing system or user thereof to provide a response indicative of whether there is an issue (e.g., "yes, there is an issue," or "no, there is no issue") and/or an indication of an estimated time of completion.

At process 707, a determination of how to present the data regarding the transfer is made. The enterprise computing system 102 may determine how to present the data regarding the transfer based on the context or application of the transfer. In various examples, the enterprise computing system 102 may present the data using a multi-layered visualization as described by various examples herein. For example, the enterprise computing system 102 may determine that the transfer is an international wire transfer and therefore a multi-layered visualization comprising a first visualization having multiple nodes positioned on a geographical map, one for each involved computing system, and a second visualization layer having transfer status graphical indicators should be used. In another example, the enterprise computing system 102 may determine that the particular user making the request (e.g., at process 722) has multiple transfers that need to be visualized. Accordingly, based on the data set for the multiple transfers, the enterprise computing system 102 may generate corresponding visualization layers to accommodate the data set. For example, the second visualization layer and/or a third visualization layer may be generated if particular data fields in the data set are present.

At process 708, an interactive visualization is generated. The enterprise computing system 102 then generates the interactive visualization based on the determination of how to present the data. For example, the enterprise computing system 102 may generate the interactive visualization using processes similar to as described in reference to method 200. As alluded to above, the data regarding the transfer and/or data regarding multiple transfers within the user profile may be rendered within the interactive visualization. As an example, data regarding multiple transfers may each have a current status (e.g., complete, pending at second intermediary enterprise, failed, etc.), an initiation date, a cost (e.g., fees), a payment amount, a name of destination bank, and/or name of recipient (e.g., name of person or company associated with the destination account at the destination bank). The enterprise computing system 102 may generate the interactive visualization to include a first layer having a geographical depiction of each intermediary enterprise, the initiating enterprise, and destination enterprise. The interactive visualization may also include a second layer having an indication or connector for each of the multiple transfers and associated initiation date, payment amount, and cost. Moreover, the interactive visualization may also include a third layer including a graphical indicator of the names of the recipients and the date at which the transfer was completed. In this way, the enterprise computing system 102 may render multiple visualization layers that may be stacked and displayed to a user on a user device 102 in order to provide most, all, or at least an indication of the acquired data in a useful and interactive display.

At process 725, the interactive visualization is provided to the user device. In some embodiments, the enterprise computing system 102 provides the interactive visualization to the user device 101 via the network 106. The user device 101 then displays the received interactive visualization to a user. In some embodiments, as alluded to above, the display may be a touchscreen, an AR or VR display on an eye ware device, and/or another type of monitor or display. The user device 101 may then monitor for user inputs and a determination of whether a user input is detected is made at process 709. In some embodiments, the user input may include a voice command (e.g., detected via a microphone on the user device 101), a click from a mouse or keyboard, a physical gesture detected from an eye tracking system or a gesture tracking system, and/or other type of user input. In response to detecting the user input, the user device 101 may transmit an indication of the user input to the enterprise computing system 102 and/or otherwise respond. If no user input is detected, then the interactive visualization may continue to be displayed and/or updated in pre-determined time periods. In response to receiving the indication of the detected user input, the enterprise computing system 102 may determine if additional information is needed to be retrieved at process 706. For example, the user input may include a voice command of "show me the first transfer status information at enterprise X." If available, the enterprise computing system 102 may update the interactive visualization to include the first transfer status information at enterprise X at process 710. If the information is not available, the enterprise computing system 102 has determined that additional information is needed and proceeds to process 702 to retrieve the first transfer status information at a computing system of enterprise X. If the information cannot be retrieved, the issue is reported via a notification to the user device 101, for example, at process 703.

Figure 8:
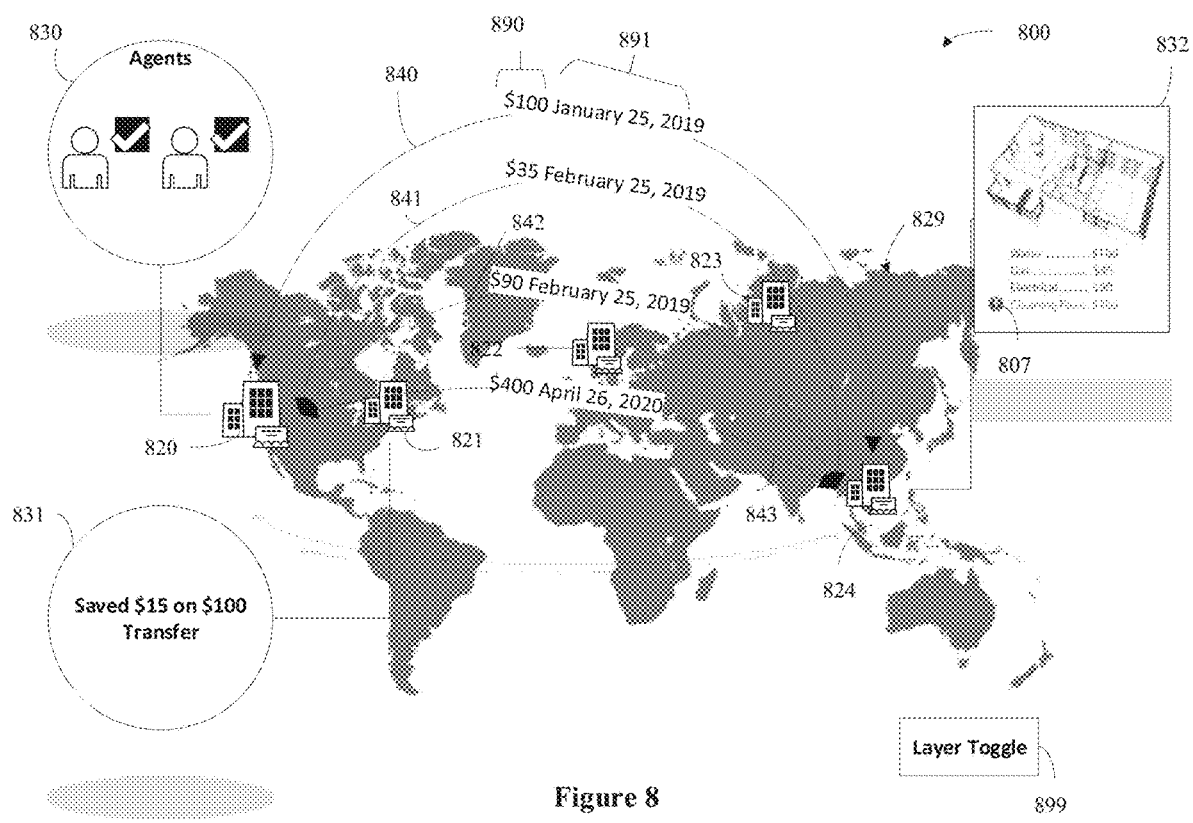
FIG. 8 depicts a multi-layered visualization for a user, according to various potential embodiments.

Referring now to FIG. 8, depicts a multi-layered visualization 800 for a user, according to an exemplary embodiment. The multi-layered visualization 800 may be one example of the interactive visualization generated at process 708. In this example, the multi-layered visualization includes three visualization layers having stacked data. A first visualization layer includes a geographical map 829 having a first node 820, a second node 821, a third node 822, a fourth node 823, and a fifth node 824, each of the nodes corresponding to an enterprise involved in one or more transfers and geographically positioned on the map in a geographic position associated with a respective enterprise. In this example, each of the nodes are depicted using a three dimensional graphical indicator.

The second layer includes information regarding one or more transfers. In this example, the one or more transfers include a first connector 840 associated with a first transfer, a second connector 841 associated with a second transfer, a third connector 842 associated with a third transfer, and fourth connector 843 associated with a fourth transfer. In this example, the enterprise computer system 102, responsive to a request received from a user interface, determined that the four transfers were associated with the user and thus should be included in the visualization 800. In this example, each connector 840, 841, 842, and 843 includes an indication of a payment amount 890, an indication of the transfer date 891.

The third layer includes information for one or more of the nodes relating generally to the transfers and/or information determined by the enterprise computing system 102 that is a priority to depict to the user. For example, the third layer includes a first graphical indicator 830 depicting the agents at the first node 820 (e.g., the initiating enterprise) that were involved with one or more of the transfers, a second graphical indicator 831 indicating savings information at the second node 821 (e.g., a first intermediary enterprise), and a third graphical indicator 832 indicating context of the transfer. In this example, a user located in San Francisco may own a flat or rental property in Indonesia. The user may access their account from the enterprise computing system 102 requesting to view the transfers associated with payments for the flat or rental property. The enterprise computing system 102 may then access or retrieve information for each payment, generate the visualization 800, and cause the visualization 800 to display on the user device 101 similar to as described above. The third graphical indicator 832 includes a visual of the flat or rental property and information regarding each of the identified transfers associated with the flat. In this example, the third graphical indicator 832 includes a warning 807 within the third graphical indicator 832 that indicates to the user that a transfer associated with the cleaning fees (e.g., the fourth transfer 843) for the flat have not been transferred and/or received yet. That is, the enterprise computing system 102 has identified an issue with the transfer associated with the cleaning fees (e.g., the fourth transfer 843) and has issued a notification to warn the user that the transfer has not been completed. The other transfers (e.g., first, second, and third transfers) are displayed without a warning thereby indicating to the user that no issues have been identified with respect to them. In this example, the user may issue a voice command (e.g., user input) to see the information regarding the fourth transfer 843. Responsive to the voice command, the enterprise computing system 102 may determine the information available or otherwise retrieve additional data regarding the fourth transfer 843 from the various nodes associated with the fourth transfer 843 and update the display to show the status and geographic position of the fourth transfer 843 along with any retrievable indications of why the transfer has been delayed or otherwise failed. For example, the visualization may be updated to only display the step-by-step processes taken with respect to the fourth transfer 843 at each node and/or an indication that the fourth transfer 843 is at the third node 822 and the expected processing date at the third node 822. In other examples, additional or alternative data may be retrieved based on the context of the transfer and the nodes involved. Similar to as described above, a user input may select any of the connectors, transfers, graphical indicators, and/or nodes. Responsive to the user input, the enterprise computing system 102 may proceed with processes 709, 706, and 710 in order to dynamically retrieve information requested from the respective computing systems associated with one or more of the transfers.

Moreover, a user input may indicate to the enterprise computing system 102 and/or user device 101 that the user wishes to call one of the agents at the first node 811. In this example, the user input may be an eye gesture toward the first graphical indicator 830 and/or one of the agents. Responsive to detecting the eye gesture, the user device 101 may request contact information for the agent and/or first node 820 from the enterprise computing system 102, which may retrieve and transmit back the contact information. In some embodiments, the user device 101 may automatically call or otherwise contact the agent using the received information. Another user input may indicate to the enterprise computing system 102 that the user wishes to see additional information associated with the second graphical indicator 831. In this example, the user input may be a click or selection of the second graphical indicator 831. Responsive to the user input, the enterprise computing system 102 may determine whether additional information regarding why the user saved $15 is needed. In some embodiments, the enterprise computing system 102 implements one or more machine learning algorithms to update the visualization with an explanation of why the user saved $15 (e.g., "You saved $15 by transferring the water payment in January. January is associated with better exchange rates and less fees."). It is to be appreciated that these example are not meant to be limited and additional information may be determined to be needed based on the context of the transfers and/or user inputs.

Figure 9:
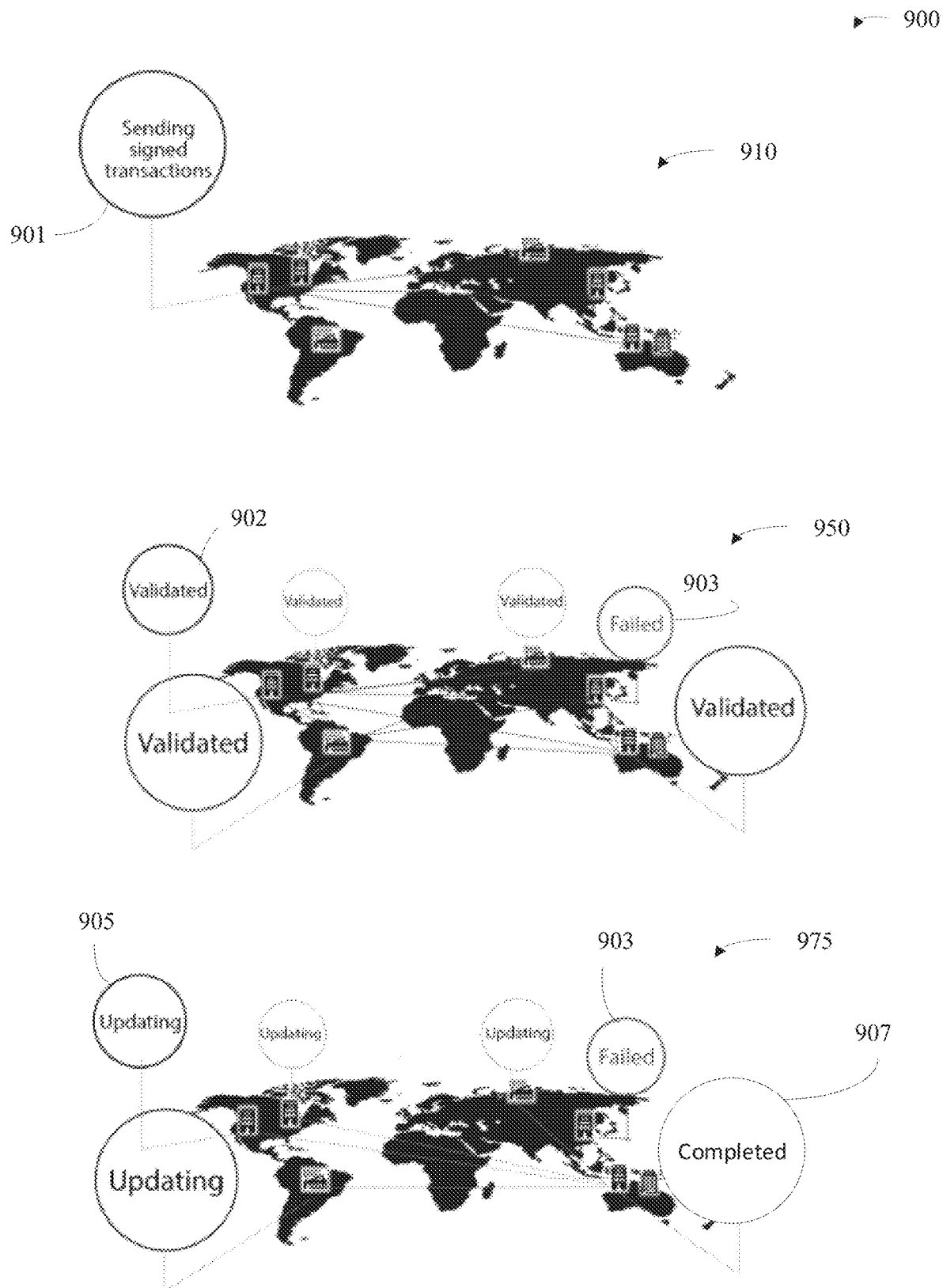
FIG. 9 depicts multiple visualizations as the visualization is updated with additional information over time, according to various potential embodiments.

Referring now to FIG. 9, depicts multiple visualizations 900 as a visualization is updated with additional information over time, according to an exemplary embodiment. For example, FIG. 9 includes a first visualization 910 at a first time, a second visualization 950 at a second time, and a third visualization 975. The first, second, and third visualizations 910, 950, and 975 show, for example, how the interactive visualization may be updated at subsequent times based on newly retrieved or received information. In this example, the first, second, and third visualizations 910, 950 and 975 relate to a block chain or distributed ledger technology (DLT) transfers. The first, second, and third visualizations 910, 950 and 975 include first layer having a geographical map and multiple nodes, each node corresponding to a respective enterprise, and a second layer including one or more graphical indicators representative of a status of the transfer at a respective node. For example, the first visualization 910 includes a first graphical indicator 901 depicting a message that a first node is sending a signed transaction at the first time. The second visualization 950 includes a multiple graphical indicators such as a first graphical indicator 902 depicting the status of the transfer at the first node as validated. In this example, validated may indicate to the user that the DLT information has been checked and validated similar to the validation processes described above. A second graphical indicator 903 may depict a message that a fifth node has failed to validate the DLT. That is, the distributed ledger at the fifth node may include a hash that has been modified. This may prompt a user to issue a user input and thereby cause the enterprise computing system 102 to retrieve additional data regarding the distributed ledger from the fifth node along with any information related to why the distributed ledger could not be validated and display that information to the user in an updated visualization (e.g., similar to the updated visualization described in reference to FIG. 6).

The third visualization 975 includes a first graphical indicator 905 that indicates to the user that the enterprise computing system 102 is in the process of updating the status of the respective node. For example, the visualization may, in some embodiments, be dynamically updated and/or displayed before all of the information regarding the transfer is compiled. The third visualization 975 may also include a second graphical indicator 907 for the destination node (e.g., destination enterprise) indicating that the transaction using the DLT has been completed. In this way, the user is able to visualize and interact with the many enterprises associated with a transfer via the visualization provided by the enterprise computing system 102.

It is noted that any element in a visualization may be selectable to allow the user to obtain additional information about the selected element. To aid interactions, visualizations may allow switching between sets of elements (e.g., layers) through, for example, a Layer Toggle element 899 shown in FIG. 8. In various embodiments, different layers may include or be associated with different information. For example, a first layer may represent geographical or physical elements, a second layer may represent a first transfer with a first time stamp, and third layer may represent a second transfer with a second time stamp). Layers may vary on interactivity in addition to graphical elements and visual representations, such that, for example, one layer may be rotatable while another layer may be zoomed or panned.

Various potential embodiments of the approach disclosed herein will now be presented:

Various embodiments may relate to a method comprising generating a first visualization layer comprising a set of geographic or physical destinations in a route, the set of destinations comprising a first node, a second node, and a third node, identifying a first computing application program interface (API) protocol corresponding with the first node, and a second API protocol corresponding with the second node, executing the first API protocol to obtain, from a first computing system, a first status of a transfer and executing the second API protocol to obtain, from a second computing system, a second status of the transfer, generating a second visualization layer comprising a first graphic corresponding with the first status and a second graphic corresponding with a second status, and displaying an overlay of the first visualization layer with the second visualization layer such that at least two nodes in the set of destinations are displayed in association with the first and second graphics.

Generating the first visualization layer may comprise determining the set of geographic or physical destinations in the route based on information regarding the transfer including an initiating enterprise and a destination enterprise.

Identifying the first API protocol may comprise identifying a first computing system associated with the first node and cross-referencing the first computing system within an API database.

Identifying the second API protocol may comprise identifying a second computing system associated with the second node and cross-referencing the first computing system within the API database.

Executing the first API protocol may comprise generating a request to the first computing system for the first status, the first status comprising an amount and currency of the transfer received and an amount and currency of the transfer sent.

The method may further comprise: receiving a user input, the user input comprising a selection of the first node; and in response to the user input, updating the display to include information regarding an entity associated with the first node, the information regarding the entity comprising contact information for the entity and an agent associated with the transfer at the entity.

The method may further comprise: accessing historical transfer information for one or more of the nodes; estimating a completion date of the transfer based on the historical information of the one or more nodes; and augmenting the overlay to include a graphical indication of the estimated time.

The method may further comprise: accessing historical transfer information for one or more of the nodes; and determining a probability score indicative of the likelihood that the transfer is completed based on the historical transfer information of the one or more nodes.

The overlay may be displayed on augmented reality (AR) glasses comprising an eye tracking system, a microphone, and a gesture capture system, the gesture capture system configured to enable a user of the AR glasses to cause the display to interactively update based on one or more captured gestures.

The method may further comprise: receiving a user input indicative of a toggle between the first visualization layer and the second visualization layer; and responsive to the user input, displaying only the first visualization layer or the second visualization layer.

The method may further comprise: identifying a third computing API protocol corresponding with the third node; and executing the third API protocol to obtain, from a third computing system, a third status; wherein the second visualization layer comprises a third graphic corresponding to the third status.

The method may further comprise: accessing a third status corresponding to the third node from memory; wherein the second visualization layer comprises a third graphic corresponding to the third status.

Various embodiments relate to a non-transitory computer readable media including instructions stored thereon. The instructions, when executed by one or more processors configured to cause the operations including generating a first visualization layer comprising a set of geographic or physical destinations in a route, the set of destinations comprising a first node, a second node, and a third node, identifying a first computing application program interface (API) protocol corresponding with the first node, and a second API protocol corresponding with the second node, executing the first API protocol to obtain, from a first computing system, a first status of a transfer and executing the second API protocol to obtain, from a second computing system, a second status of the transfer, generating a second visualization layer comprising a first graphic corresponding with the first status and a second graphic corresponding with a second status, and providing a graphical user interface (GUI) comprising an overlay of the first visualization layer with the second visualization layer such that at least two nodes in the set of destinations are displayed in association with the first and second graphics.

The non-transitory computer readable media may comprise instructions that, when executed by one or more processors, cause the operations of: generating a first visualization layer comprising a set of geographic or physical destinations in a route, the set of destinations comprising a first node, a second node, and a third node; identifying a first computing application program interface (API) protocol corresponding with the first node, and a second API protocol corresponding with the second node; executing the first API protocol to obtain, from a first computing system, a first status of a transfer and executing the second API protocol to obtain, from a second computing system, a second status of the transfer; generating a second visualization layer comprising a first graphic corresponding with the first status and a second graphic corresponding with a second status; and providing a graphical user interface (GUI) comprising an overlay of the first visualization layer with the second visualization layer such that at least two nodes in the set of destinations are displayed in association with the first and second graphics.

Generating the first visualization layer may comprise the operations of determining the set of geographic or physical destinations in the route based on information regarding the transfer including an initiating enterprise and a destination enterprise.

The non-transitory computer readable media may comprise instructions configured to cause the operations of: generating a third visualization layer comprising a first graphical indicator including an indication of multiple related transfers; and displaying the third visualization layer overlaid on the first visualization layer and the second visualization layer.

The GUI may be provided to augmented reality (AR) glasses via a network.

The non-transitory computer readable media may comprise instructions configured to cause the operations of: in response to receiving a user gesture captured by the AR glasses, updating the GUI to display additional information associated with the user gesture.

Various embodiments may relate to a system including a processor and a memory storing instructions thereon. The instructions, when executed by the processor, cause operations including generate a first visualization layer comprising a set of geographic or physical destinations in a route, the set of destinations comprising a first node, a second node, and a third node, identify a first computing application program interface (API) protocol corresponding with the first node, and a second API protocol corresponding with the second node, execute the first API protocol to obtain, from a first computing system, a first status of a transfer and executing the second API protocol to obtain, from a second computing system, a second status of the transfer, generate a second visualization layer comprising a first graphic corresponding with the first status and a second graphic corresponding with a second status, and provide a graphical user interface (GUI) comprising an overlay of the first visualization layer with the second visualization layer such that at least two nodes in the set of destinations are displayed in association with the first and second graphics.

The system may further comprise instructions that, when executed by the processor, cause the operations including identify a third computing API associated with the third node.

The system of may further comprise instructions that, when executed by the processor, cause the operation including, execute the third API to obtain a third status of the transfer from a third computing system.

The system may further comprise instructions that, when executed by the processor, cause the operation including, obtain information regarding a second transfer, the second transfer comprising a fourth node, a fifth node, and a sixth node along a second route; and update the first visualization to include the fourth node, the fifth node, and the sixth node.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" or "computing system" may include hardware structured to execute the associated functions described herein. In some embodiments, each respective "circuit" or "computing system" may include machine-readable media for configuring the hardware to execute the associated functions described herein. The "circuit" or "computing system" may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" or "computing system" may include any type of component for accomplishing or facilitating achievement of the associated operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" or "computing system" may also include one or more processors communicatively coupled to one or more memory or memory devices. In this regard, the one or more processors may execute instructions stored in the memory or may execute instructions otherwise accessible to the one or more processors. The one or more processors may be constructed in a manner sufficient to perform at least the associated operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" or "computing system" as described herein may include components that are distributed across one or more locations.

An exemplary system for implementing the overall system or portions of the embodiments might include a computer(s), including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A computer-implemented method comprising:
generating a first visualization layer comprising a set of geographic or physical indicators in a multi-nodal transfer route, the transfer route comprising a set of three or more nodes that include terminal nodes and at least one transitional node, wherein the geographic or physical indicators correspond to locations of computing systems that are along the transfer route and that implement transfers between nodes in the set of three or more nodes of the transfer route;
executing one or more application program interface (API) protocols to obtain data corresponding to a first node and a second node in the transfer route;
generating a second visualization layer comprising, based on the data, a first graphic visually depicting a first detail of a transfer of an item along the transfer route and a second graphic visually depicting a second detail of the transfer of the item along the transfer route; and
displaying an overlay of the first visualization layer with the second visualization layer such that the first graphic and the second graphic are displayed in association with at least two nodes in the set of three or more nodes.

2. The method of claim 1, wherein executing the one or more API protocols comprises executing a first API protocol to obtain, from a first computing system, a first data packet corresponding to the first node, and executing a second API protocol to obtain, from a second computing system, a second data packet corresponding to the second node.

3. The method of claim 2, further comprising identifying the first computing API protocol as corresponding to the first node in the transfer route, and the second API protocol as corresponding to the second node in the transfer route.

4. The method of claim 1, wherein generating the first visualization layer comprises identifying, via one or more computing systems, the set of geographic or physical indicators in the multi-nodal transfer route.

5. The method of claim 1, wherein generating the first visualization comprises rendering a geographic model of the transfer route.

6. The method of claim 5, further comprising displaying a first graphical indicator that links the first detail to a first geographic location in the first visualization, and a second graphical indicator that links the second detail to a second geographic location in the first visualization.

7. The method of claim 1, further comprising visually stacking data by displaying (i) a first stack indicating a first transfer from the first node to the second at a first time, and (ii) a second stack indicating a second transfer from the first node to the second node at a second time.

8. The method of claim 1, wherein the second visualization layer corresponds to a first transfer along the transfer route with a first time stamp, and wherein the method further comprises generating a third visualization layer corresponding to a second transfer along the transfer route with a second time stamp.

9. The method of claim 8, further comprising displaying a graphical layer toggle enabling selection of which visualization layer is currently controllable such that a user may interact with graphical elements associated with a selected visualization layer.

10. The method of claim 9, further comprising increasing a visibility of the selected visualization layer relative to another visualization layer.

11. The method of claim 1, wherein the first and second nodes are transitional nodes.

12. The method of claim 1, further comprising:
receiving a user input indicating a selection of one of the nodes; and
in response to receiving the user input, updating the displayed overlay to include additional information regarding the selected node.

13. The method of claim 1, further comprising applying a machine-learning model to transfer data to generate a prediction of a future transfer detail, and augmenting the displayed overlay with a graphical depiction of the prediction.

14. The method of claim 1, further comprising:
accessing historical transfer information for one or more of the nodes; and
determining a likelihood that the transfer is completed based on the historical transfer information for the one or more nodes.

15. The method of claim 1, wherein the overlay is displayed on augmented reality (AR) glasses configured to enable a user of the AR glasses to cause the display to interactively update based on one or more captured gestures.

16. The method of claim 1, further comprising capturing a gesture corresponding to selection of one of the nodes in the transfer route, and augmenting the overlay with additional information related to the selected node.

17. A computer-implemented method comprising:
generating a first visualization layer comprising a set of geographic or physical indicators in a multi-nodal transfer route comprising a set of three or more nodes that include terminal nodes and at least one transitional node;
executing one or more application programming interface (API) protocols to obtain data corresponding to a first node and to a second node in the transfer route, wherein the one or more API protocols comprises a first API protocol in an API database, and a second API protocol in the API database, the first API protocol having a first specification and the second API protocol having a second specification;
generating a second visualization layer comprising, (i) based on the data, a first graphic visually depicting a first detail of a transfer of an item along the transfer route and, (ii) based on the second data packet, a second graphic visually depicting a second detail of the transfer of the item along the transfer route; and
displaying an overlay of the first visualization layer with the second visualization layer such that the first graphic and the second graphic are displayed in association with at least two nodes in the set of three or more nodes.

18. The method of claim 17, wherein executing the one or more API protocols comprises:

generating a first API request according to a first specification, and executing a first API to transmit the first API request to a first computing system to obtain a first data packet corresponding to the first node, wherein the first data packet is generated and transmitted by the first computing system in response to receiving the first API request; and generating a second API request according to a second specification, and executing a second API to transmit the second API request to the second computing system to obtain a second data packet corresponding to the second node, wherein the second data packet is generated and transmitted by the second computing system in response to receiving the second API request.

19. The method of claim 18, wherein the first data packet comprises first time and location information for an item received or detected by the first computing system along the transfer route, and wherein the second data packet comprises second time and location information for the item received or detected by the first computing system along the transfer route.

20. A system comprising one or more processors configured to:
- generate a first visualization layer comprising a set of geographic or physical indicators in a route comprising a set of nodes that includes a first node, a second node, and a third node, wherein the geographic or physical indicators correspond to locations of computing systems that are along the route and that are involved in transfers between nodes in the set of nodes of the route;
- execute one or more application program interface (API) protocols to obtain, from a first computing system, a first status of a transfer and to obtain, from a second computing system, a second status of the transfer;
- generate a second visualization layer comprising a first graphic corresponding with the first status and a second graphic corresponding with a second status; and
- provide a graphical user interface (GUI) comprising an overlay of the first visualization layer with the second visualization layer such that at least two nodes in the set of nodes are displayed in association with the first and second graphics.

* * * * *